United States Patent
Miyahira et al.

(12) 
(10) Patent No.: US 10,043,384 B2
(45) Date of Patent: Aug. 7, 2018

(54) MANAGEMENT OF MOBILE OBJECTS AND SERVICE PLATFORM FOR MOBILE OBJECTS

(71) Applicant: International Business Machines Corporation, Armonk, NY (US)

(72) Inventors: Tomohiro Miyahira, Tokyo (JP); Gaku Yamamoto, Machida (JP)

(73) Assignee: International Business Machines Corporation, Armonk, NY (US)

( * ) Notice: Subject to any disclaimer, the term of this patent is extended or adjusted under 35 U.S.C. 154(b) by 58 days.

(21) Appl. No.: 15/210,207

(22) Filed: Jul. 14, 2016

(65) Prior Publication Data

US 2017/0178501 A1 Jun. 22, 2017

Related U.S. Application Data

(63) Continuation of application No. 14/970,596, filed on Dec. 16, 2015, now Pat. No. 9,460,616.

(51) Int. Cl.
*G08G 1/01* (2006.01)
*H04L 29/08* (2006.01)
(Continued)

(52) U.S. Cl.
CPC ........ *G08G 1/0125* (2013.01); *G08G 1/0141* (2013.01); *G08G 1/0967* (2013.01); *H04L 67/12* (2013.01); *H04W 4/021* (2013.01)

(58) Field of Classification Search
CPC .. G08G 1/0125; G08G 1/0141; G08G 1/0967; H04L 67/12; H04W 4/021
See application file for complete search history.

(56) References Cited

U.S. PATENT DOCUMENTS 6,150,961 A 11/2000 Alewine et al.
7,395,151 B2 7/2008 O'Neill et al.
(Continued)

FOREIGN PATENT DOCUMENTS

CN 102147260 A 8/2011
CN 102231231 A 11/2011
(Continued)

OTHER PUBLICATIONS

Defintion of register, retrived from www.google.com, date unknown, all pages.*
(Continued)

*Primary Examiner* — Calvin Cheung
(74) *Attorney, Agent, or Firm* — Erik K. Johnson

(57) ABSTRACT

An embodiment includes a mobile object server and a registration server. The mobile object server is receives information from each of a plurality of mobile objects within a geographic space and performs a process associated with each mobile object. The mobile object server performs processes by mobile object agents associated with the plurality of mobile objects. The registration server registers a first additional process that is to be performed in addition to a first basic process common to the plurality of mobile objects. The first additional process is associated with one mobile object. The registration server registers the first additional process with one mobile object agent. The registration server registers the first additional process and a call-up condition by the one mobile object agent. The mobile object server calls up the first additional process in response to the call-up condition being satisfied during performance of the one mobile object agent.

15 Claims, 19 Drawing Sheets

(51) Int. Cl.
  *H04W 4/021* (2018.01)
  *G08G 1/0967* (2006.01)

(56) References Cited

U.S. PATENT DOCUMENTS

| | | |
|---|---|---|
| 7,447,588 B1 | 11/2008 | Xu et al. |
| 7,689,348 B2 | 3/2010 | Boss et al. |
| 7,696,887 B1 | 4/2010 | Echavarria |
| 7,710,421 B2 | 5/2010 | Muramatsu |
| 7,751,971 B2 | 7/2010 | Chang et al. |
| 7,899,611 B2 | 3/2011 | Downs et al. |
| 7,979,172 B2 | 7/2011 | Breed |
| 8,000,887 B2 | 8/2011 | Nathan et al. |
| 8,396,652 B2 | 3/2013 | Nomura |
| 8,428,876 B2 | 4/2013 | Lee |
| 8,620,510 B1 | 12/2013 | Meuth et al. |
| 8,768,012 B2 | 7/2014 | Satoh |
| 8,799,246 B2 | 8/2014 | Nomura et al. |
| 8,818,608 B2 | 8/2014 | Cullinane et al. |
| 8,850,013 B2 | 9/2014 | Waldman et al. |
| 8,862,146 B2 | 10/2014 | Shatsky et al. |
| 8,930,269 B2 | 1/2015 | He et al. |
| 8,988,252 B2 | 3/2015 | Scholl et al. |
| 2005/0065711 A1 | 3/2005 | Dahlgren et al. |
| 2007/0109303 A1 | 5/2007 | Muramatsu |
| 2007/0241932 A1 | 10/2007 | Otero et al. |
| 2007/0244634 A1 | 10/2007 | Koch et al. |
| 2008/0020781 A1 | 1/2008 | Cho |
| 2008/0046134 A1 | 2/2008 | Bruce et al. |
| 2008/0174485 A1 | 7/2008 | Carani et al. |
| 2009/0070024 A1 | 3/2009 | Burchard et al. |
| 2009/0248758 A1 | 10/2009 | Sawai et al. |
| 2009/0287405 A1 | 11/2009 | Liu et al. |
| 2009/0309789 A1 | 12/2009 | Verechtchiagine |
| 2009/0326991 A1 | 12/2009 | Wei et al. |
| 2010/0036595 A1 | 2/2010 | Coy et al. |
| 2010/0184452 A1 | 7/2010 | Choi |
| 2010/0188265 A1 | 7/2010 | Hill et al. |
| 2010/0199213 A1 | 8/2010 | Suzuki |
| 2010/0256836 A1 | 10/2010 | Mudalige |
| 2011/0037619 A1 | 2/2011 | Ginsberg et al. |
| 2011/0130916 A1 | 6/2011 | Mayer |
| 2011/0205040 A1 | 8/2011 | Van Wiemeersch et al. |
| 2011/0300905 A1 | 12/2011 | Levi |
| 2012/0053778 A1 | 3/2012 | Colvin et al. |
| 2012/0092187 A1 | 4/2012 | Scholl et al. |
| 2012/0291049 A1 | 11/2012 | Park et al. |
| 2013/0006925 A1 | 1/2013 | Sawai et al. |
| 2013/0204524 A1 | 8/2013 | Fryer et al. |
| 2013/0214939 A1 | 8/2013 | Washlow et al. |
| 2013/0297387 A1 | 11/2013 | Michael |
| 2013/0321397 A1 | 12/2013 | Chen et al. |
| 2014/0055276 A1 | 2/2014 | Logan et al. |
| 2014/0120953 A1 | 5/2014 | Ingram et al. |
| 2014/0136099 A1 | 5/2014 | Choi et al. |
| 2014/0191858 A1 | 7/2014 | Morgan et al. |
| 2014/0195214 A1 | 7/2014 | Kozloski et al. |
| 2014/0236414 A1 | 8/2014 | Droz et al. |
| 2014/0248899 A1 | 9/2014 | Emadzadeh et al. |
| 2014/0278026 A1 | 9/2014 | Taylor |
| 2014/0278029 A1 | 9/2014 | Tonguz et al. |
| 2014/0289267 A1 | 9/2014 | Felix et al. |
| 2015/0051822 A1 | 2/2015 | Joglekar |
| 2015/0066284 A1 | 3/2015 | Yopp |
| 2015/0120083 A1 | 4/2015 | Gurovich et al. |
| 2015/0149019 A1 | 5/2015 | Pilutti et al. |
| 2015/0179077 A1 | 6/2015 | Morgan et al. |
| 2015/0332519 A1 | 11/2015 | Hiura et al. |
| 2015/0348417 A1 | 12/2015 | Ignaczak et al. |
| 2017/0255966 A1* | 9/2017 | Khoury ............... G06Q 30/0266 |

FOREIGN PATENT DOCUMENTS

| | | |
|---|---|---|
| CN | 102997928 A | 3/2013 |
| CN | 103247176 A | 8/2013 |
| CN | 103258043 A | 8/2013 |
| CN | 103971529 A | 8/2014 |
| DE | 10030819 A1 | 1/2002 |
| DE | 102005020154 A1 | 11/2006 |
| EP | 1914701 A2 | 4/2008 |
| JP | 11083511 A | 3/1999 |
| JP | 2001028004 A | 1/2001 |
| JP | 2007286706 A | 11/2007 |
| JP | 2008123197 A | 5/2008 |
| JP | 2008123325 A | 5/2008 |
| JP | 2008262418 A | 10/2008 |
| JP | 2008294921 A | 12/2008 |
| JP | 2009277078 A | 11/2009 |
| JP | 2011158339 A | 8/2011 |
| JP | 4985119 B2 | 7/2012 |
| JP | 2012150515 A | 8/2012 |
| JP | 2012155286 A | 8/2012 |
| JP | 2013045242 A | 3/2013 |
| JP | 2013101119 A | 5/2013 |
| JP | 2013101120 A | 5/2013 |
| JP | 2014065362 A | 4/2014 |
| JP | 2014075008 A | 4/2014 |
| JP | 2014095663 A | 5/2014 |
| JP | 2015018396 A | 1/2015 |
| JP | 2015081057 A | 4/2015 |
| KR | 101354607 B1 | 1/2014 |
| WO | 2007140527 A1 | 12/2007 |
| WO | 2011081157 A1 | 7/2011 |
| WO | 2012167174 A1 | 12/2012 |
| WO | 2013167085 A2 | 11/2013 |

OTHER PUBLICATIONS

Pending U.S. Appl. No. 15/210,178, filed Jul. 14, 2016, entitled: "Management of Mobile Objects and Service Platform for Mobile Objects", pp. 1-68.

IBM: List of IBM Patents or Patent Applications Treated As Related (Appendix P), Jul. 14, 2016, pp. 1-2.

Abrougui et al., "Efficient load balancing and QoS-based location aware service discovery protocol for vehicular ad hoc networks," EURASIP Journal on Wireless Communications and Networking, Mar. 2012, pp. 1-15, Springer.

Aulinas et al., "Local map update for large scale SLAM," Electronics Letters, Apr. 15, 2010, p. 1-2, vol. 46, No. 8.

Dangel et al., "Can Road Traffic Volume Information Improve Partitioning for Distributed SUMO?," Modeling Mobility with Open Data, Lecture Notes in Mobility, 2015, p. 61-74, Springer International Publishing.

DRM, "Local Dynamic Map," DRM Research Seminar, Jun. 30, 2010, p. 1-72, Japan Digital Road Map Association.

Hong et al., "A grid-based node split algorithm for managing current location data of moving objects," The Journal of Supercomputing, Dec. 2007, p. 321-337, vol. 42, Issue 3, Springer.

Hsu et al., "Automatic Traffic Monitoring Method Based on Cellular Model," Fifth International Conference on Intelligent Information Hiding and Multimedia Signal Processing, 2009, p. 640-643, IEEE Computer Society.

Ihm et al., "Advanced Spatial Data Management for Enterprise Applications," An Oracle White Paper, Aug. 2010, p. 1-16, Oracle Spatial 11g.

Openstreetmap, "QuadTiles," OpenStreetMap Wiki, Last Modified on Mar. 3, 2014, p. 1-10, http://wiki.openstreetmap.org/wiki/QuadTiles, Accessed on Jun. 15, 2015.

Ortelli, "Server-side clustering of geo-points on a map using Elasticsearch," Trifork Blog, Aug. 1, 2013, p. 1-14, http://blog.trifork.com/2013/08/01/server-side-clustering-of-geo-points-on-a-map-using-elasticsearch/, Accessed on Jun. 15, 2015.

Pawlowski et al., "Applying Event Stream Processing on Traffic Problem Detection," Progress in Artificial Intelligence (EPAI), 2009, p. 27-38, LNAI vol. 5816, Springer-Verlag Berlin Heidelberg.

Schade, "Sharing Data by Means of a Local Dynamic Map," Understanding the Standards for Cooperative ITS, Feb. 6, 2014, p. 1-10, MINES ParisTech, Transportation Sustainability Environment Consulting.

(56) References Cited

OTHER PUBLICATIONS

Suzumura et al., "X10-based Massive Parallel Large-Scale Traffic Flow Simulation," ProVISION, Winter 2012, p. 74-79, No. 72, IBM Professionals' Papers.
Y et al., "A Complex Event Processing System Approach to Real Time Road Traffic Event Detection," Journal of Convergence Information Technology (JCIT), Oct. 2013, p. 142-148, vol. 8, No. 15.
Yang et al., "Spatio-temporal Coupled Bayesian Robust Principal Component Analysis for Road Traffic Event Detection," Proceedings of the 16th International IEEE Annual Conference on Intelligent Transportation Systems (ITSC 2013), Oct. 6-9, 2013, p. 392-398, IEEE, The Hague, The Netherlands.
Gotoh et al., "Geographic Space Management," Application and Drawings, Filed on Jun. 19, 2015, p. 1-97, U.S. Appl. No. 14/744,052.
Gotoh et al., "Geographic Space Management," Application and Drawings, Filed on Jun. 25, 2015, p. 1-95, U.S. Appl. No. 14/750,298.
Gotoh et al., "Geographic Space Management," Application and Drawings, Filed on Jun. 25, 2015, p. 1-95, U.S. Appl. No. 14/750,334.
Gotoh et al., "Geographic Space Management," Application and Drawings, Filed on Jul. 8, 2015, p. 1-93, U.S. Appl. No. 14/793,934.
Gotoh et al., "Geographic Space Management," Application and Drawings, Filed on Jun. 19, 2015, p. 1-95, U.S. Appl. No. 14/744,056.
Gotoh et al., "Geographic Space Management," Application and Drawings, Filed on Jul. 16, 2015, p. 1-92, U.S. Appl. No. 14/800,774.
Gotoh et al., "Geographic Space Management," Application and Drawings, Filed on Jul. 16, 2015, p. 1-92, U.S. Appl. No. 14/800,782.
Gotoh et al., "Geographic Space Management," Application and Drawings, Filed on Jun. 19, 2015, p. 1-94, U.S. Appl. No. 14/744,066.
Gotoh et al., "Geographic Space Management," Application and Drawings, Filed on Jul. 16, 2015, p. 1-91, U.S. Appl. No. 14/800,795.
Gotoh et al., "Geographic Space Management," Application and Drawings, Filed on Jul. 16, 2015, p. 1-91, U.S. Appl. No. 14/800,811.
Gotoh et al., "Geographic Space Management," Application and Drawings, Filed on Jun. 19, 2015, p. 1-93, U.S. Appl. No. 14/744,067.
Gotoh et al., "Geographic Space Management," Application and Drawings, Filed on Jul. 16, 2015, p. 1-91, U.S. Appl. No. 14/800,821.
Gotoh et al., "Geographic Space Management," Application and Drawings, Filed on Jul. 16, 2015, p. 1-91, U.S. Appl. No. 14/800,839.
Gotoh et al., "Management of Moving Objects," Application and Drawings, Filed on Jun. 19, 2015, p. 1-46, U.S. Appl. No. 14/744,071.
Gotoh et al., "Management of Moving Objects," Application and Drawings, Filed on Jul. 17, 2015, p. 1-46, U.S. Appl. No. 14/802,289.
Gotoh et al., "Management of Moving Objects," Application and Drawings, Filed on Jul. 17, 2015, p. 1-46, U.S. Appl. No. 14/802,316.
Yamamoto, "Management of Moving Objects," Application and Drawings, Filed on Jun. 19, 2015, p. 1-59, U.S. Appl. No. 14/744,074.
Yamamoto, "Management of Moving Objects," Application and Drawings, Filed on Jul. 17, 2015, p. 1-58, U.S. Appl. No. 14/802,343.
Yamamoto, "Management of Moving Objects," Application and Drawings, Filed on Jul. 17, 2015, p. 1-58, U.S. Appl. No. 14/802,361.
Gotoh et al., "Management of Events and Moving Objects," Application and Drawings, Filed on Jul. 7, 2015, p. 1-69, U.S. Appl. No. 14/792,805.
Gotoh et al., "Management of Events and Moving Objects," Application and Drawings, Filed on Jul. 16, 2015, p. 1-68, U.S. Appl. No. 14/801,014.
Gotoh et al., "Management of Events and Moving Objects," Application and Drawings, Filed on Jul. 16, 2015, p. 1-68, U.S. Appl. No. 14/801,054.
Miyahira et al., "Management of Mobile Objects and Service Platform for Mobile Objects," Application and Drawings, Filed on Dec. 16, 2015, p. 1-69, U.S. Appl. No. 14/970,596.
Nishimura et al., "Management of Dynamic Events and Moving Objects," Application and Drawings, Filed on Dec. 16, 2015, p. 1-92, U.S. Appl. No. 14/970,600.
Ishikawa et al., "Management of Evacuation With Mobile Objects," Application and Drawings, Filed on Dec. 16, 2015, p. 1-50, U.S. Appl. No. 14/970,609.
Gotoh et al., "Geographic Space Management," Application and Drawings, Filed on Dec. 16, 2015, p. 1-72, U.S. Appl. No. 14/970,616.
Ishikawa et al., "Management of Mobile Objects and Resources," Application and Drawings, Filed on Dec. 16, 2015, p. 1-52, U.S. Appl. No. 14/970,626.
Gotoh et al., "Management of Mobile Objects," Application and Drawings, Filed on Dec. 16, 2015, p. 1-65, U.S. Appl. No. 14/970,631.
Ishikawa et al., "Management of Mobile Objects," Application and Drawings, Filed on Dec. 16, 2015, p. 1-78, U.S. Appl. No. 14/970,643.
IEEE, definition of "Server", IEEE 100, The Authoritative Dictionary of IEEE Standards Terms, Seventh Edition, Downloaded on May 11, 2009, p. 1031.
IEEE, definition of "System", IEEE 100, The Authoritative Dictionary of IEEE Standards Terms, Seventh Edition, downloaded on May 11, 2009, p. 1143.

* cited by examiner

Event List

| Edge ID | Event ID | Location | Event Content | Influence Event |
|---|---|---|---|---|
| Edge 0001 | Eve 0214 | Full Length | Speed Limited to 30km/h | Eve 0114(Edge 0002) |
| Edge 0002 | Eve 0114 | 32m from the 1st node | Closure | Eve 0214(Edge 0001), Eve 0421(Edge 0003)... |
| ...... | ...... | ...... | ...... | ...... |
| Edge 1000 | N/A | : | : | Eve 1201 (edge xxxx) |

FIG.9

| Edge ID | Counts | Location | Event Content |
|---|---|---|---|
| Edge 0009 | 2 | Full length | Congestion |
| Edge 0013 | 1 | 15m from the 2nd node | Skid |
| ••••• | ••••• | ••••• | |

Candidate Event List

FIG. 10

| Edge ID | Event ID | Location | Event Content |
|---|---|---|---|
| Edge 0001 | Eve 0214 | Full Length | Speed Limited to 30km/h |
| Edge 0002 | Eve 0114 | 32m from the 1st node | Closure |

Notification Event List

FIG.11

| Mobile Object ID | Current Location (State) | Current Location (City) | Owner | Passenger Age | Passenger Feature | Number of Other Passengers |
|---|---|---|---|---|---|---|
| 158691 | Tokyo | Setagaya | Individual | 35 | Owner | 0 |
| 582762 | Kanagawa | Yokohama | Individual | 56 | Wife of Owner | 3 |
| 685103 | Tokyo | Machida | Company | 26 | Employee | 2 |
| 980227 | Tokyo | Shinjuku | Individual | 36 | Unregistered | 0 |
| ····· | ····· | ····· | ····· | ····· | ····· | ····· |

Feature Information

*FIG.17*

MANAGEMENT OF MOBILE OBJECTS AND SERVICE PLATFORM FOR MOBILE OBJECTS

BACKGROUND

The present invention relates to management of mobile objects and a service platform for mobile objects.

A high-speed driving support and automobile system is known that receives information from a plurality of automobiles, acquires information concerning accidents or obstructions on the road and maps this information onto a map along with the position of an automobile, and references automobile position information, automobile characteristic information, and driver characteristic information to transmit suitable event information to each automobile.

However, such a system has a problem that as the geographic space being handled expands, the number of automobiles and the number of roads increases, thereby increasing the amount of information being sent and received to a level that surpasses the processing capability of the server. In addition to event information in the geographic space, such a system is desired to be able to provide different information and services or the like in real time for each automobile or each driver. Furthermore, a function is desired that enables a service provider other than the designer, manager, and/or proprietor of this system to provide information, services, and the like.

SUMMARY

According to a first aspect of the present invention, provided is a system, method and computer program product including a mobile object server and a registration server. The mobile object server is operable to receive information from each of a plurality of mobile objects within a geographic space and perform a process associated with each mobile object. The mobile object server is operable to perform processes by mobile object agents associated with the plurality of mobile objects. The registration server is operable to register a first additional process that is to be performed in addition to a first basic process common to the plurality of mobile objects. The first additional process is associated with one mobile object of the plurality of mobile objects. The registration server is operable to register the first additional process with one mobile object agent associated with the one mobile object. The registration server is operable to register the first additional process and a call-up condition by the one mobile object agent. The mobile object server is operable to call up the first additional process in response to the call-up condition being satisfied during performance of the one mobile object agent.

BRIEF DESCRIPTION OF THE SEVERAL VIEWS OF THE DRAWINGS

FIG. 9 shows an illustrative example of an event list.

FIG. 10 shows an illustrative example of a candidate event list.

FIG. 11 shows an illustrative example of a notification event list.

FIG. 17 shows exemplary feature information according to the present embodiment.

DETAILED DESCRIPTION

Hereinafter, example embodiments of the present invention will be described. The example embodiments shall not limit the invention according to the claims, and the combinations of the features described in the embodiments are not necessarily essential to the invention.

Figure 1:
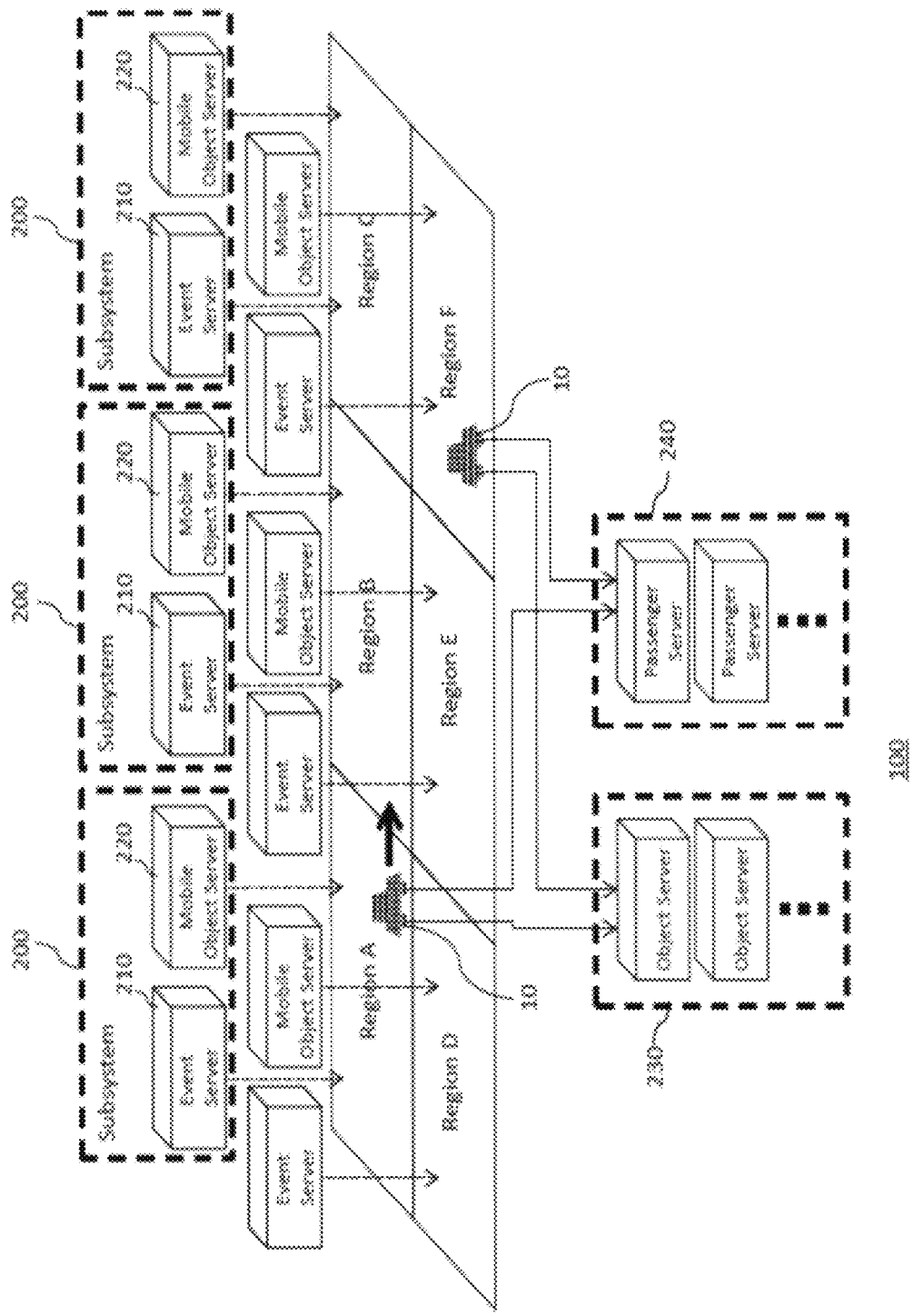
FIG. 1 shows a system 100 according to an embodiment of the present invention and a map area corresponding to a geographic space managed by the system 100.

FIG. 1 shows a system 100 and a map area corresponding to a geographic space managed by the system 100, according to an embodiment of the present invention. The system 100 manages a geographic space that includes routes on which a mobile object 10 moves. The system 100 is operable to divide the geographic space into a plurality of regions and manage these regions. A mobile object 10 may move on routes including land routes, sea routes, and/or air routes, for example. The geographic space may be land, sea, or air space that includes the routes on which the mobile object travels. The mobile objects 10 may be manned/unmanned automobiles, motorbikes, bicycles, humans having a digital device, airplanes, vessels, drones, or the like.

FIG. 1 shows an automobile as an example of the mobile object 10, which moves along roads as examples of land routes. The system 100 includes a plurality of subsystems 200 that respectively manage the plurality of regions. FIG. 1 shows an example in which the map area is divided into six regions from region A to region F, and six subsystems 200 respectively manage these six regions.

System 100 comprises a plurality of event servers 210, a plurality of mobile object servers 220, a plurality of object servers 230, and a plurality of passenger servers 240. According to the embodiment of FIG. 1, each of the subsystems 200 may include at least one of the plurality of event servers 210 and one of the plurality of mobile object servers 220.

The event server 210 manages events occurring in each region of the geographic space. In one embodiment, the event server 210 of subsystem 200 assigned to region A may manage events in region A. The plurality of mobile object servers 220 respectively assigned to a plurality of regions in a geographic space manage the mobile objects 10 in each of the plurality of regions. In one embodiment, the mobile object server 220 assigned to region A may manages mobile objects 10 located in region A. The object server 230 manages information of the mobile objects 10 regardless of the location of the mobile objects 10. The passenger server 240 manages information of at least one passenger riding on the mobile objects 10.

Each of the subsystems 200 may be implemented on one or more servers. In one embodiment, each event server 210 and mobile object server 220 may be implemented on one server. In one embodiment, a set of an event server 210 and a mobile object server 220 in a subsystem 200 may be implemented by one server. Portions of the system 100 other than the subsystems 200 may also be implemented on one or more servers. In one embodiment, each object server 230 and passenger server 240 may be implemented on one server. In another embodiment, a set of object servers 230 and a set of passenger servers 240 may be each implemented by one server. In yet another embodiment, all of the object servers 230 and the passenger servers 240 may be implemented on one server. These servers may exist at any point on a network including the Internet, a subscriber network, a cellular network, or a desired combination of networks. The servers may be computers or other types of data processors, and may be dedicated servers, or may be shared servers that perform other operations.

The system 100 acquires the positions of a mobile object 10 from the mobile object 10, and the mobile object server 220 managing the region that includes the acquired position of the mobile object 10 may manage the movement of this mobile object 10. The system 100 acquires information of events that have occurred to the mobile object 10 and/or on the road outside, and the event server 210 managing the region including the position where such an event has occurred may manage the state of the event.

This event may include information about accidents, obstructions, closure, limitation, status, or construction on the road, or information about the weather, temperature, buildings, shops, or parking lots near the road. In response to a setting or a request from the mobile object 10, the subsystem 200 may provide notification about the event information to the mobile object 10 that made the request. For example, if the mobile object 10 is moving on a route in a geographical area corresponding to region A, then the mobile object sever 220 managing region A provides this mobile object 10 with the notification about the event relating to the route.

Since the map area is divided into a plurality of regions, despite the mobile object 10 simply moving on a route, the region corresponding to the position of the mobile object 10 might change. FIG. 1 shows an example in which the mobile object 10 is driving on a road such that the position of the mobile object 10 moves from region A to region B on the regions. In this case, according to the movement of the mobile object 10, the system 100 may transfer the information concerning the mobile object 10 from the mobile object server 220 managing region A to the mobile object server 220 managing region B, and may also transfer the management of the mobile object 10 to the mobile object server 220 managing region B.

Figure 2:
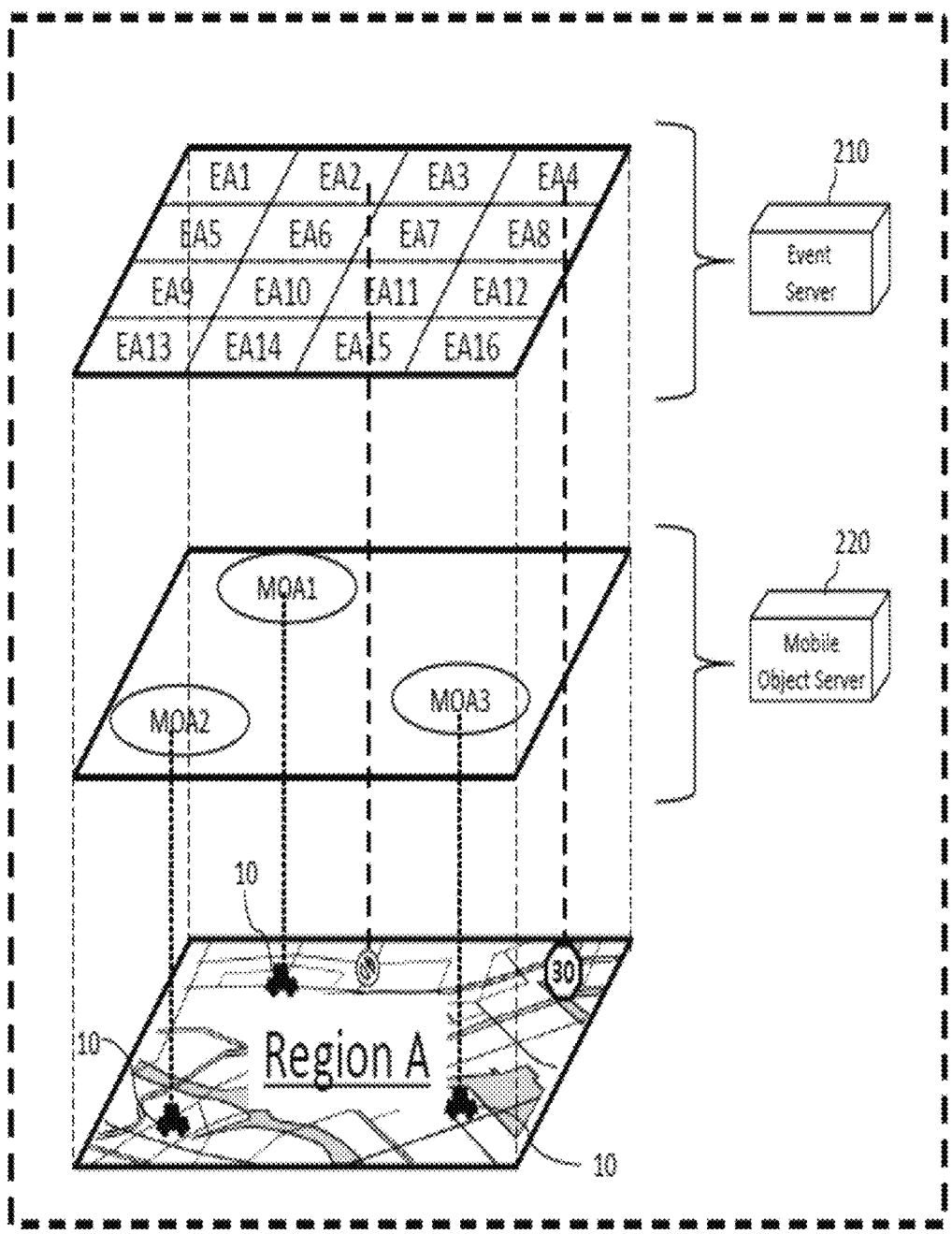
FIG. 2 shows a subsystem 200 according to the embodiment of the present invention and a map area corresponding to a region A managed by the subsystem 200.

FIG. 2 shows a subsystem 200 and a map area corresponding to a region A managed by the subsystem 200, according to an embodiment of the present invention. The event server 210 manages at least one event agent, and executes each event agent to manage events on routes in a region assigned to the event server 210. An "agent" may be a software entity having specific data, and may operable to receive a message (e.g. command), and return a result of the message. Each region of the plurality of regions of geographic space includes at least a portion of one area of the plurality of areas. In this embodiment, the region assigned to the event server 210 is the same as the region assigned to the mobile object server 220. However, in other embodiments, these regions may be different.

In the embodiment of FIG. 2, the region A, which is the region assigned to the event server 210, is divided into 16 areas and 16 areas are assigned to each of the event agents EA1-EA16. The event server 210 executes each of the event agents EA1-EA16 to manage events occurring on routes of each area of region A. For example, the event agent EA2 may manage a "closure" event on an area corresponding to EA2 on the map, and the event agent EA4 may manage a "speed limit" event on an area corresponding to EA4 as shown in FIG. 2.

The plurality of mobile object servers 220 may include at least one mobile object server 220 including one or more mobile object agents, each of which is assigned to each of the mobile objects 10. In the embodiment of FIG. 2, the mobile object server 220 includes three mobile object agents MOAs 1-3 assigned to three mobile objects 10 in the assigned region A. The mobile object server 220 executes each of the mobile object agents MOA1-MOA3 to manage the mobile objects 10 traveling on the region A.

Figure 3:
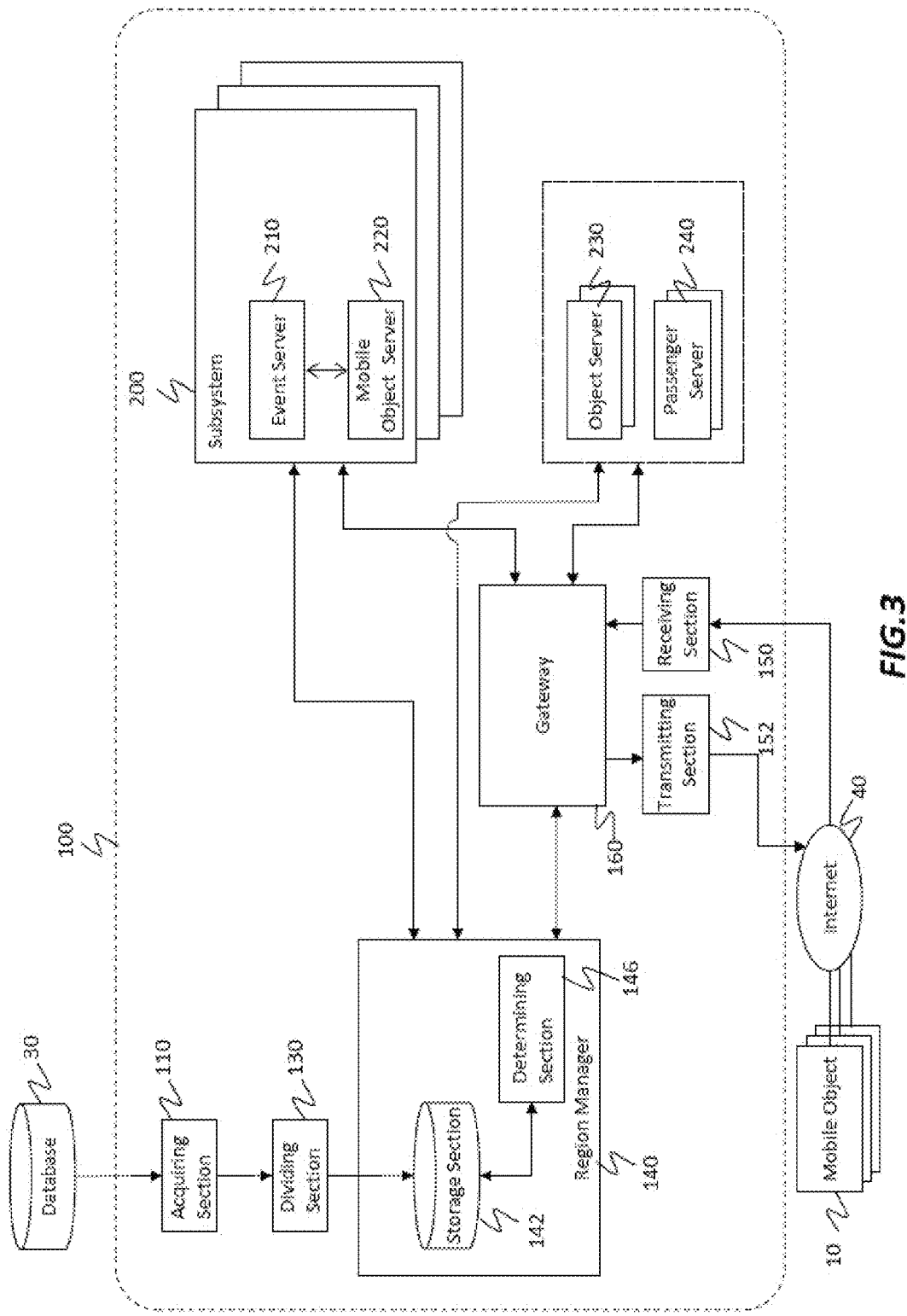
FIG. 3 shows a first exemplary configuration of the system 100 according to the present embodiment.

FIG. 3 shows an exemplary configuration of the system 100, according to an embodiment of the present invention. The system 100 may be operable to communicate with each of a plurality of mobile objects 10 to send and receive the information used to manage the mobile objects 10. The system 100 may be operable to acquire map data and/or information exchanged with the mobile objects 10, through the Internet, a subscriber network, a cellular network, or any desired combination of networks. The system 100 includes an acquiring section (i.e., module) 110, a dividing section 130, a region manager 140, a receiving section 150, a transmitting section 152, a gateway apparatus 160, a plurality of subsystems 200, a plurality of object servers 230, and a plurality of passenger servers 240.

The acquiring section 110 may be operable to acquire map data corresponding to the geographical areas where a mobile object 10 is positioned, from an external database 30, for example. In response to the map being updated, the acquiring section 110 may acquire some or all of the updated map data. The acquiring section 110 may be operable to acquire the map data from the Internet, a subscriber network, a cellular network, or any desired combination of networks. The system 100 may be operable to store the map data in advance.

The acquiring section 110 may further acquire an event that has occurred within the geographic space to be managed by the system 100. In this case, the acquiring section 110 may acquire, accident information, traffic information, weather information, time information, etc.

The dividing section 130 may be operable to communicate with the acquiring section 110 and divide the map area into a plurality of regions. In this embodiment, the dividing section 130 generates two groups of regions by dividing an original map area into a plurality of regions.

The region manager 140 may be operable to store information concerning the plurality of regions including the regions resulting from the division. The region manager 140 may be operable to specify the subsystem 200 managing the region that includes the position of the mobile object 10, in response to receiving the position of the mobile object 10. The region manager 140 may be implemented on one or more servers. The region manager 140 includes a storage section 142 and a determining section 146.

The storage section 142 may be operable to communicate with the dividing section 130 and store information concerning the plurality of first regions and the plurality of second regions resulting from the division by the dividing section 130. The storage section 142 may store setting values or the like of the system 100.

The storage section 142 may store intermediate data, calculation results, threshold values, parameters, and the like that are generated by or used in the operations of the system 100. In response to a request from any component within the system 100, the storage section 142 may supply the data stored therein to the component making the request. The storage section 142 may be a computer readable storage medium such as an electric storage device, a magnetic storage device, an optical storage device, an electromagnetic storage device, or a semiconductor storage device.

The determining section 146 may be operable to communicate with the storage section 142, and determine one region from the plurality of regions (e.g., regions A-F of FIG. 1) in which each of the mobile objects 10 is located based on the position information of the mobile object 10 and geographic information of the plurality of regions. The determining section 146 may identify a route or position in the map area managed by the system 100 that corresponds to the position information of the mobile object 10.

The determining section 146 may store the position information of this mobile object 10 and/or information of the determined region in the storage section 142, in association with this mobile object 10. The determining section 146 may store a history of the position information of this mobile object 10 and/or a history of the determined mobile object server 220 in the storage section 142. The determining section 146 may be a circuit, a shared or dedicated computer readable medium storing computer readable program instructions executable by a shared or dedicated processor, etc.

The receiving section 150 may be operable to receive information transmitted from each of a plurality of mobile objects 10. Each mobile object 10 may transmit information at designated time intervals, and the receiving section 150 may sequentially receive this transmitted information. In this embodiment, the receiving section 150 may receive car probe data from each mobile object 10 as the information. The car probe data may include information detected by the mobile object 10, such as position information of the mobile object 10.

In one embodiment, the position information may include longitude and latitude (and optionally altitude information) of the mobile object 10 in an absolute coordinate system. In another embodiment, the mobile object 10 may determine its location in the absolute coordinate system by using GPS, and the determining section 146 receiving the position information may determine a route on which the mobile object 10 exists and a specific location of the route at which the mobile object 10 exists based on the position information. Alternatively, the mobile object 10 may include such detailed position information in the car probe data.

The receiving section 150 may communicate with the plurality of mobile objects 10 and receive the car probe data of each mobile object 10, via the Internet 40. The receiving section 150 may receive the car probe data of the plurality of mobile objects 10 through wireless communication, a subscriber network, a cellular network, or any desired combination of networks.

The transmitting section 152 may be operable to transmit event information to each of the mobile objects 10 according to settings, for example. The transmitting section 152 may transmit information concerning the route on which the mobile object 10 is expected to travel. The transmitting section 152 may communicate with the mobile objects 10 and transmit each type of information to the mobile objects 10 via the Internet 40. The transmitting section 152 may transmit each type of information to the mobile objects 10 through wireless communication, a subscriber network, a cellular network, or any desired combination of networks.

The gateway apparatus 160 may be operable to transfer communication between the plurality of subsystems 200 and the plurality of mobile objects 10. The gateway apparatus 160 may communicate with the receiving section 150 and receive the information transmitted by each mobile object 10.

The gateway apparatus 160 may communicate with the region manager 140 and demand the transfer destination for each piece of information received from the mobile objects 10, of the region manager 140. In response to this request, the gateway apparatus 160 may receive from the region manager 140 the information of the subsystem 200 managing the region on which the mobile object 10 exists. The gateway apparatus 160 may transfer the information received from the mobile object 10 to the subsystem 200 that is to manage the mobile object 10. In other words, the gateway apparatus 160 may transfer the information received from each mobile object 10 to the subsystem 200 determined by the region manager 140.

The gateway apparatus 160 may communicate with each of the subsystems 200, and receive the information transmitted by each subsystem 200. The gateway apparatus 160 may communicate with the transmitting section 152 and supply the transmitting section 152 with the information received from each subsystem 200, such that this information is transferred to the mobile objects 10 designated for each subsystem 200.

The gateway apparatus 160 may include a plurality of gateway devices, and may quickly perform transfer between the plurality of subsystems 200 and the plurality of mobile objects 10. In this case, the receiving section 150 may function as a load balancer that supplies the information from the mobile objects 10, such that the load is spread among the plurality of gateways. The load balancer may sequentially supply information from the mobile objects 10 to the gateways having lighter loads. The gateway apparatus 160 may be a network that provides a connection between a plurality of networks using the same or different types of protocols.

A plurality of subsystems 200 may be operable to communicate with the region manager 140 and the gateway apparatus 160 and to respectively manage a plurality of regions in a geographic space. Each subsystem 200 is operable to manage mobile objects 10 that travel routes in its managing region and to manage events on its managing region.

As described, each subsystem 200 may include the event server 210 and the mobile object server 220. The event server 210 manages events occurring on its managing region with the plurality of the event agents. In one embodiment, the event server 210 may perform, through the event agent, (i) registration, update and/or deletion of events, (ii) registration, update and/or deletion of candidate events, and (iii) provision of event information.

The mobile object server 220 manages the plurality of the mobile objects 10 traveling on its managing region with the plurality of the mobile object agents. In one embodiment, the mobile object server 220 may perform, through the mobile object agent, (i) processing of the car probe data, (ii) update of information of the mobile object, and (iii) provision of information to the mobile object. For example, the mobile object server 220 may execute the mobile object agent to collect information of events from at least one event server 210, and provide the mobile object 10 with information that assists the mobile object 10 with traveling in the geographic space.

A plurality of object servers 230 including at least one object server 230 may communicate with the gate way 160 and include an object agent (OA) containing information of the mobile object 10. An object agent may correspond to each mobile object 10 and contain information thereof. In one embodiment, the object agent may contain (i) information, by region, of which subsystem currently manages a mobile object agent of the mobile object 10, (ii) an identification (ID) of the mobile object 10, (iii) an ID of a passenger of the mobile object 10, and (iv) a characteristic of the mobile object 10 (e.g., model/version information, width, length, and/or height of the mobile object 10).

The object server 230 may perform, through the object agent, (i) provision and/or update of information of the mobile object 10, (ii) registration, update, and/or deletion of the ID of passenger riding on the mobile object 10, (iii) provision and/or update of the information of the region of the mobile object 10, and (iv) provision of information needed for generation of a new mobile object agent by the mobile object server 220.

At least one passenger server 240 of a plurality of passenger servers may communicate with the gateway 160, and include a passenger agent that contains information of at least one passenger. A passenger agent may correspond to each passenger or candidate passenger of mobile objects 10, and contain information thereof. In one embodiment, the object agent may contain an ID of a passenger and a characteristic of the passenger (e.g., information of age, gender, type, and the like of license of the passenger). The passenger server 240 may perform, through the passenger agent, provision and/or update of information of the passengers.

As described above, the system 100 of the present embodiment may manage the mobile objects by utilizing the mobile object agents in each mobile object server 220, and manage the events by utilizing the event agent in each event server 210. According to the system 100 of the embodiment, the system 100 can separately manage information relating to the mobile objects 10 and events on the geographic map with a plurality of kinds of servers. Furthermore, the plurality of mobile object servers 220 can smoothly transfer the management of the mobile objects 10 traveling across the regions via the mobile object agents, thereby improving the efficiency of the whole system 100. In addition, according to the system 100 of the embodiment, each event server 210 divides event management in one region among the plurality of event agents and provides the mobile object agent with event information, thereby improving the efficiency of event management in the region (e.g., improving response time of event search) and thus event notification to the mobile objects 10. In addition, the system 100 can provide the mobile object agent with information of mobile object 10 by the object agent of the object server 230. The system 100 can also provide the mobile object agent with information of passengers of the mobile objects 10 by the passenger agent of the passenger server 240.

Figure 4:
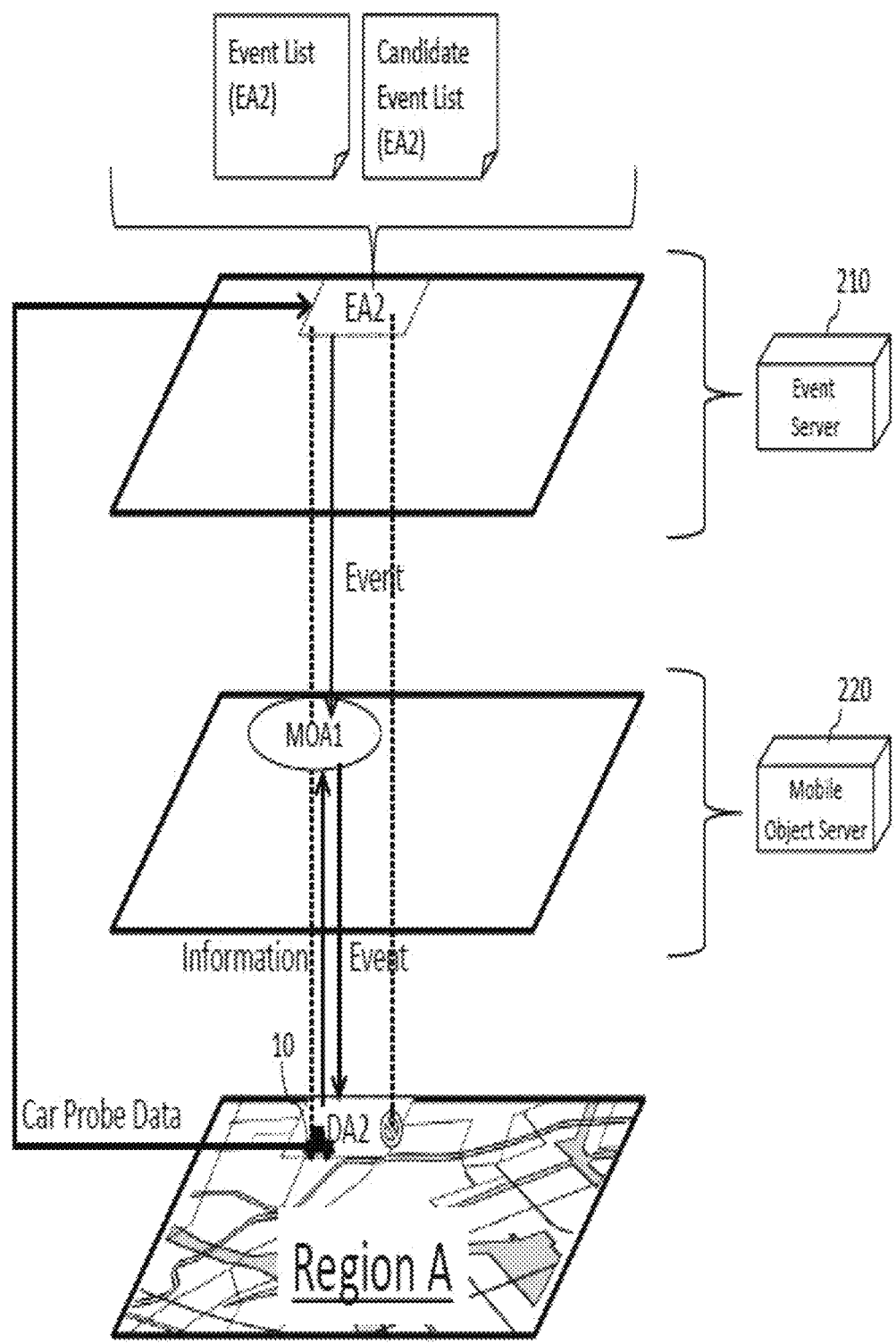
FIG. 4 shows management of events by the event server 210 and the mobile object server 220 according to one embodiment.

FIG. 4 shows management of events by the event server 210 and the mobile object server 220, according to an embodiment of the present invention. In this embodiment, a mobile object 10 is traveling on a target route on region A and transmitting a car probe data including the position information to the event server 210 managing region A with the car probe data via a gateway apparatus, such as the gateway apparatus 160. The event server 210 manages event information through each event agent based on the car probe data from the mobile objects on region A. For example, each event agent may manage an event list (containing information of an event and an influence event for routes on the area managed by the event agent) and a candidate event list (containing information of candidates of an event for routes on the area managed by the event agent).

In the embodiment of FIG. 4, the event agent EA2 manages events of an area (indicated as "DA2" on the region A of FIG. 4) by the event list of the event agent EA2 and the candidate event list of the event agent EA2 based on car probe data from the mobile object 10 on the area DA2. For example, the event agent EA2 assigned to the area DA2 is executable to generate an event based on the information from the mobile object 10.

In one embodiment, each mobile object server 220 is operable to receive information from the mobile object 10 in the region A assigned to the mobile object server 220. The mobile object server 220 determines the target route where the mobile object 10 is located. The mobile object server 220 sends the information to one event server 210 assigned to a region A where the mobile object 10 is located, and thereby requests the event agent EA2 assigned to the area DA2 where the target route is located to send an event list containing information of an event on the target route and the influence event of the target route.

The mobile object server 220 executes the mobile object agent MOA1 for the mobile object 10 to provide the mobile object 10 with information that assists the mobile object 10 with traveling in the area DA2 based on the information of the event on the other route and the influence event of the target route. In the embodiment of FIG. 4, the mobile object agent MOA1 receives, from the event agent EA2, the event information of the route on which the mobile object 10 exists, and provides the mobile object 10 with the event information (e.g., information of closure).

Figure 5:
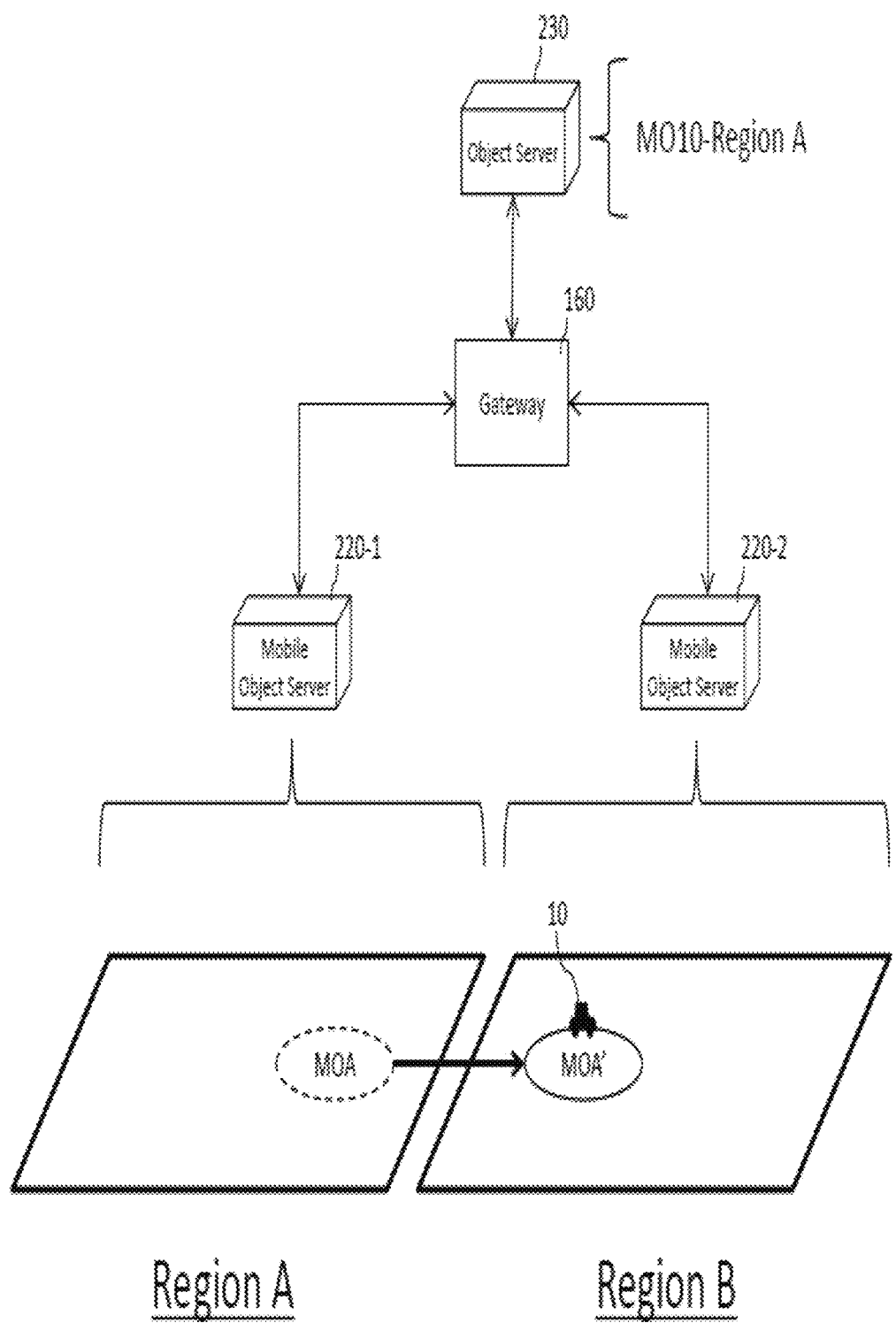
FIG. 5 shows management of mobile object by the mobile object server 220 and object server 230 according to one embodiment.

FIG. 5 shows management of a mobile object 10 by the mobile object servers 220 and object server 230, according to an embodiment of the present invention. The mobile object server 220-1 may transfer the mobile object agent to the mobile object server 220-2 assigned to a neighboring region in response to the mobile object 10 moving to the neighboring region. In this embodiment, in response to a mobile object 10 traveling from region A to region B, the mobile object server 220-1 managing region A deletes the mobile object agent MOA for the mobile object 10, and a mobile object server 220-2 managing region B generates a mobile object agent MOA for the mobile object 10.

In this embodiment, the object server 230 may store information that includes a mobile object server identifier MOS-ID that identifies one of the plurality of mobile object servers 220 executing the mobile object agent corresponding to the object agent 10. Just after the mobile object 10 arrives at region B, the mobile object server 220-2 has not been executing the mobile object agent for the mobile object 10. The mobile object server 220-2 is operable to receive information from the mobile object 10 in the region B assigned to the mobile object server 220-2.

Using the information from the mobile object 10, the mobile object server 220-2 obtains the mobile object server identifier MOS-ID from the object server 230 that manages the object agent for the mobile object 10 because the mobile object server 220-2 is not executing the mobile object agent for the mobile object 10. The mobile object server 220-2 requests a mobile object server 220-1 identified by the mobile object server identifier MOS-ID to transfer the mobile object agent for the mobile object 10. Then the mobile object server 220-1 managing region A transfers the mobile object agent to the mobile object server 220-2 assigned to a neighboring region B in response to the request.

Figure 6:
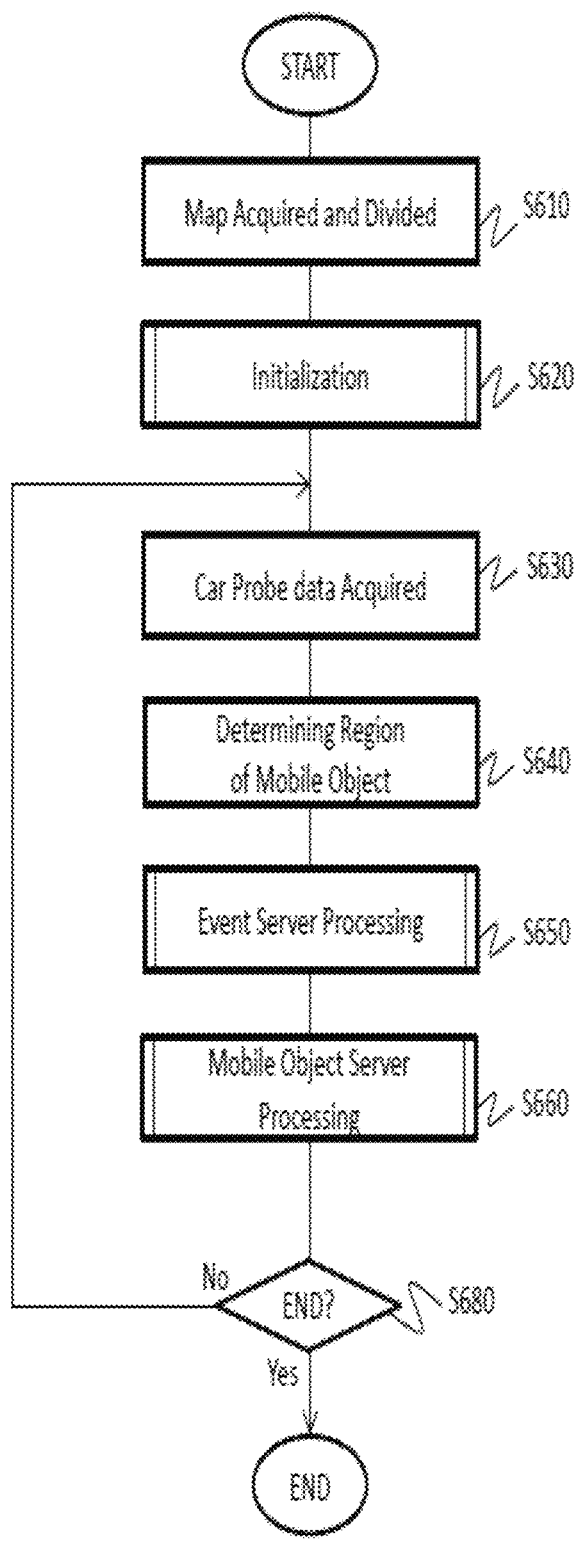
FIG. 6 shows an operational flow of an exemplary configuration of the system 100 according to the present embodiment.

FIG. 6 shows an operational flow of a system, according to an embodiment of the present invention. The present embodiment describes an example in which the system 100 performs the operations from S610 to S680 shown in FIG. 6 to manage mobile objects, such as mobile object 10, and events on a map area. FIG. 6 shows one example of the operational flow of the system 100 shown in FIGS. 1-5, but the system 100 shown in FIGS. 1-5 is not limited to using this operational flows explained below. Also, the operational flow in FIG. 6 may be performed by other systems.

First, an acquiring section, such as the acquiring section 110, may acquire the map data of the geographic space to be managed by the system (S610). The acquiring section may acquire map data of a geographic space that includes one or more cities, one or more towns, and the like. The acquiring section may include map data of a geographic space including one or more states, countries, continents, etc. A dividing section, such as the dividing section 130, may divide the map area to generate a plurality of regions.

Next, the system may perform an initialization process for the mobile object (S620). The system may perform the process of S620 if a user (passenger) initializes a setting of a mobile object and any passengers of the mobile object, before starting to drive the mobile object.

After S620, a gateway apparatus, such as the gateway apparatus 160, of the system may acquire a car probe data from the mobile object (S630). Although the system may acquire the car probe data from the plurality of the mobile objects, the system acquiring a car probe data from one mobile object (which, may be referred to as "a target mobile object") is explained in the below description. The car probe data may include information detected by the target mobile object, such as current position information of the target mobile object, a speed and/or direction of the target mobile object, and event information observed by the target mobile object (e.g., occurrence of ABS, detection of obstacles, or the like). In one embodiment, the position information may include an edge ID of an edge on which the target mobile object exists and the distance between the current location of the target mobile object and the one end of the edge.

Next, the gateway apparatus may determine a region on which the target mobile object is traveling based on the position information of the car probe data of the target mobile object (S640). In one embodiment, the gateway apparatus may inquire a region manager, such as the region manager 140, about the region on which the mobile object exists. A determining section, such as the determining section 146, of the region manager may determine the region the target mobile object and provide the gateway apparatus with the information of the region of the target mobile object. The gateway apparatus may provide an event server, such as the event server 210, that manages the determined region and a mobile object server, such as the mobile object server 220, that manages the determined region with the car probe data.

Next, the event server that is provided with the car probe data of the target mobile object may process events for the mobile objects (S650). The event server may manage event information based on the car probe data for notification of events to the target mobile object.

After S650, the mobile object server that is provided with the car probe data of the target mobile object may manage a mobile object agent for the target mobile object (S660).

After S660, the system determines whether to end the process for the target mobile object. In one embodiment, the gateway apparatus may determine whether the car probe date indicates the engine stop of the target mobile object. If the system determines not to end the process, then the system proceeds with the process of S630 for the target mobile object. If the system determines to end the process, then the system ends the process for the target mobile object, and may continue the process for other mobile objects.

As described above, the system manages mobile objects by utilizing mobile object agents realized by the plurality of the mobile object servers. Since the system can transfer the mobile object agent between the mobile object servers, it can efficiently manage the mobile objects traveling around the plurality of regions. Furthermore, the system collects car probe data from the mobile objects and manages events generated from the car probe data by utilizing the event agents. Since each event server divides a number of events occurring on its managing regions into a plurality of areas by utilizing the event agents, it can efficiently handle event information.

The process of S610 may be performed once before starting processes S620-S680. The process of S620-S680 may be performed for every mobile object.

Figure 7:
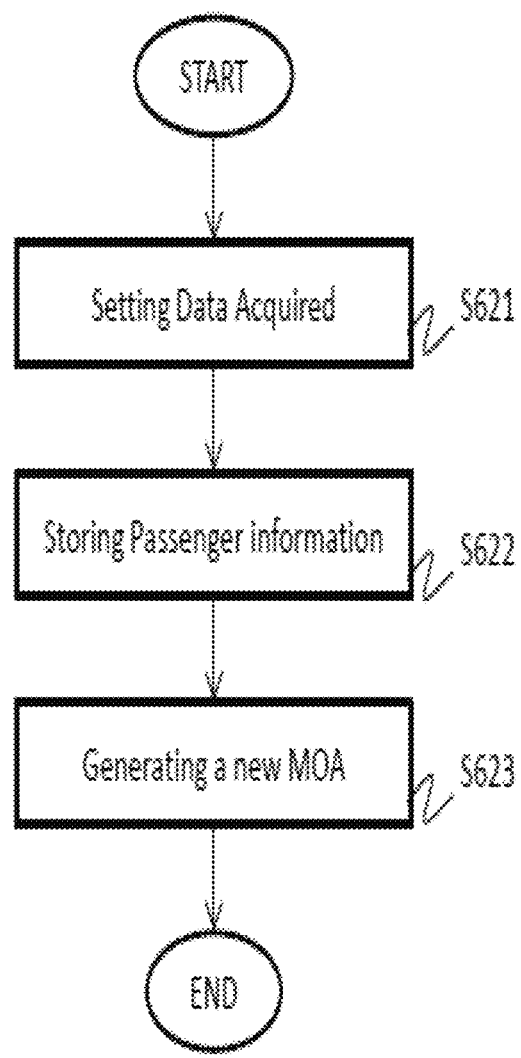
FIG. 7 shows an operational flow of S620 according to the present embodiment.

FIG. 7 shows an operational flow of an initialization process for a mobile object, according to an embodiment of the present invention. The present embodiment describes an example in which the system performs an initialization process, such as the initialization process of S620 of FIG. 6, through processes S621 to S623 shown in FIG. 7.

First, a gateway apparatus receives a setting data (including an ID of the mobile object, an ID(s) of passenger(s) and position information of the mobile object) from the mobile object (S621). The gateway apparatus determines one mobile object server that manages the mobile object based on the position information of the mobile object. The gateway apparatus provides the determined mobile object server with the setting data. Then, the determined mobile object server obtains information (e.g., ID(s) of the passenger(s)) of at least one passenger of the mobile object from the setting data of the mobile object.

Then, the mobile object server may request the object agent of the object server for the mobile object to store the information of the at least one passenger of the mobile object (S622). For example, each mobile object may be mapped to each object agent of the object servers based on values of the IDs of the mobile objects, and the mobile object server may identify one object agent corresponding to the ID of the mobile object based on the calculation using the ID. Then, the mobile object server may provide the object server managing the identified object agent with the setting data including the position information, the ID of the mobile object, and ID(s) of passenger(s) of the mobile object via the gateway apparatus.

Next, the object server stores the information of passenger(s) on an object agent. In one embodiment, each of passengers may be preliminarily mapped to each of the passenger servers based on values of the IDs of passengers, and the passenger servers may have information of passengers. The object server may identify one passenger server corresponding to the ID of a passenger based on the calculation using the ID. The object server may receive, via the gateway apparatus, the information of passengers from the passenger server corresponding to the ID. Then, the object server may store or update the information of the mobile object and the passengers of the mobile object, in the object agent for the mobile object. The object server may include the information of a region that the mobile object currently exists, in the object agent.

Next, the mobile object server 220 managing the region in which the mobile object 10 exists generates a new mobile object agent for the mobile object 10 (S623). In one embodiment, the mobile object server 220 may copy the information of the object agent for the mobile object 10 to the newly generated mobile object agent. For example, the mobile object server 220 may store the information of the mobile object 10 and the information of the at least one passenger of the mobile object 10 in the newly generated mobile object agent for the mobile object 10.

Figure 8:
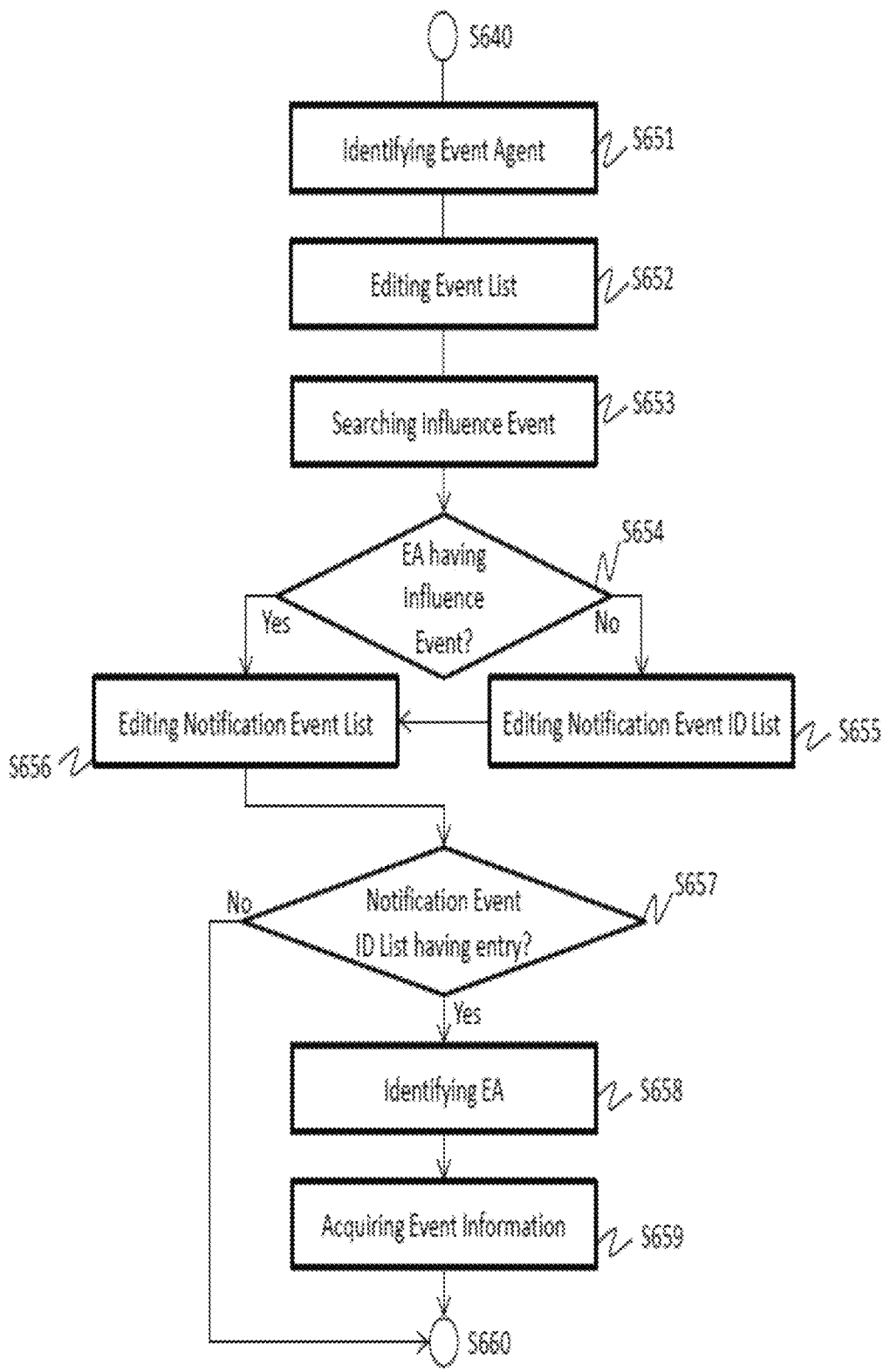
FIG. 8 shows an operational flow of S650 according to the present embodiment.

FIG. 8 shows an operational flow of event processing, according to an embodiment of the present invention. The present embodiment describes an example in which the system performs event processing, such as the event processing of S650 of FIG. 6, through processes S651 to S659 shown in FIG. 8.

First, the event server may identify an event agent (S651). In one embodiment, the event sever determines one event agent from the plurality of event agents based on the position information of the target mobile object. The determined event agent may be referred to as "target event agent." For example, the event server determines a target route (or an edge of the map data) of the target mobile object based on the position information and the map data, and selects, as a target event agent, an event agent that manages an area including the target route of the target mobile object indicated by the car probe data. In another embodiment, the car probe data of a target mobile object may include the information of the target route of the target mobile object.

Next, the event server may edit event lists by the target event agent based on the car probe data (S652). In one embodiment, the target event agent may generate or update information of events (e.g., an edge that an event occurs, an event ID, a location of an event, and content of event) of the target route on the event list based on information of the car probe data. The event of the target route may be referred to as a "target event."

Next, the event server may search, by the target event agent, an influence event on the target route on the area of the target event agent based on the car probe data (S653). The influence event of the target route relates to an event on another route within a threshold distance (e.g., a threshold travelling distance of the target route, a threshold number of edges away from the target route, and/or a threshold travelling time from the target route).

In one embodiment, the target event agent itself may search routes (or edge IDs) apart from the target route within the threshold distance based on the topology information of routes in the regions, or may request other entities (e.g., a server) to search for routes (or edge IDs).

Next, the event server may determine whether the event list of the target event agent includes event entries corresponding to all influence events of the target route searched at S653 (S654). In one embodiment, the target event agent determines whether edges of the influence events are listed as edge IDs of events in the event list.

If an area managed by a target event agent includes the routes (edges) of all influence events relating to an event, then an event list of the target event agent includes corresponding event entries of all influence events. However, if the routes (edges) of any influence events are managed by other event agents, then the event list may not include corresponding event entries of all influence events. If the decision is positive, then the event server proceeds with the process S655 and if negative, the event server proceeds with the process S656.

At S655, the event server may edit a notification event ID list by the target event agent. The notification event ID list includes IDs of influence events and edge IDs of the influence events that are determined to be not included in the event list of the target event agent at S654. In other words, the notification event ID list is a list of event IDs of influence events that are not managed by the target event agent. Then, the event server may proceed with the process of S656.

At S656, the event server may edit a notification event list for the target mobile object, by the target event agent. The notification event list is a list of events that may be helpful to the target mobile object traveling on the target route. The notification event list may include target events and influence events of the target events. The target event agent may add entries of the target events and the influence events in its managing event list for notification.

Next, the event server determines, by the target event agent, whether the notification event ID list has at least one entry. If the decision is positive, then the event server proceeds with the process of S658, and if negative, then the event server ends the process of S650.

At S658, the event server may identify, by the target event agent, an event agent that manages an event list including events in the notification event ID list. The determined event agent may be referred to as "remote event agent."

Next, the event server may acquire information of events in the notification event ID list (S659), and end the process S650. In one embodiment, the target event agent may receive information of events in the notification event ID list from the remote event agent, and edit the notification event list based on the acquired information. In another embodiment, the target event agent may add entries of the influence events in the notification event ID list based on the acquired information.

FIG. 9 shows an illustrative example of an event list, according to an embodiment of the present invention. As described in FIG. 9, the event list may include edge IDs of events, event IDs of events, locations of events, specific contents of events, and influence events relating to events. In this embodiment, each route is represented as "edge." For example, this event list indicates that an event (identified as "Eve 0214") has occurred along the full length of edge 0001 on the area, that the event has limited the speed to 30 km/h, and that edge 0001 includes an influence event identified as "Eve 0114." The event list also indicates that an event (identified as "Eve 0114" on edge 0002) has occurred 32 m from the 1st node on edge 0002 on the area, that the event is a closure of a route, and that edge 0001 includes influence events identified as "Eve 0214" on edge 0001, "Eve 0421"

on edge 0003, etc. In one embodiment, the target event agent may add a new entry corresponding to an event detected by the car probe data, in the event list.

According to the first entry in the event list of FIG. 9, the edge 0001 has influence event 0114. This may mean that a mobile object traveling on the edge 0001 is influenced by the event 0114 that has occurred apart from edge 0001 within a threshold distance. In response to receiving the car probe data including the position information indicating that the target mobile object is traveling on the edge 0001, the target event agent searches and obtains routes (edge IDs) apart from the target route (edge 0001) within the threshold distance, and then finds neighboring edge 0002 as a result. In response to receiving the car probe data including the position information of the edge 0001, the target event agent determines whether the edge of influence event (edge 0002) corresponding to the target route is listed as edge IDs in the event list.

The target event agent assigned to the area may generate or update a candidate event based on information from the target mobile object. In one embodiment, the target event agent may generate or update candidate events on the candidate event list including information of a plurality of edges on the area of the event agent based on information of the car probe data.

Although the event list of FIG. 9 includes information of influence events, the information of the influence events may be managed by another list. In one embodiment, the event agent may manage both a first event list containing information of an event on the target route and a second event list containing information of the influence event.

FIG. 10 shows an illustrative example of a candidate event list, according to an embodiment of the present invention. As described in FIG. 10, the event list may include edge IDs of candidate events, counts of detecting candidate events, locations of candidate events, and specific contents of candidate events for each candidate event. For example, this candidate event list indicates that evidence of an event (congestion) has been observed twice along the full length of edge 0009 on the area, and that evidence of an event (skid) has been observed once at a point 15 m from the 2nd node on edge 0013 on the area.

The target event agent may determine whether to change a candidate event in the candidate event list to an event in the event list. In one embodiment, the target event agent may upgrade the candidate event to the event based on information from other mobile objects. In this case, the target event agent counts occurrences of a candidate event observed by a plurality of mobile objects (including the target mobile object and other mobile objects). If the count of a candidate event exceeds a threshold value, then the target event agent determines that the candidate event is upgraded to an event. In one embodiment, in response to the upgrade, the target event agent deletes the entry of the candidate event from the candidate event list, and generates a new entry of an event corresponding to the deleted candidate event. The event servers may set the same or different criteria for upgrading candidate events among the plurality of event agents.

FIG. 11 shows an illustrative example of a notification event list, according to an embodiment of the present invention. As described in FIG. 11, the notification event list may include edge IDs of target/influence events, event IDs of target/influence events, locations of target/influence events, and specific contents of target/influence events. For example, this notification event list indicates that an event (speed limit) has occurred along the full length of edge 0001 on the area, and that an event (closure) has occurred at a point 32 m from the 1st node on edge 0002 on the area.

Figure 12:
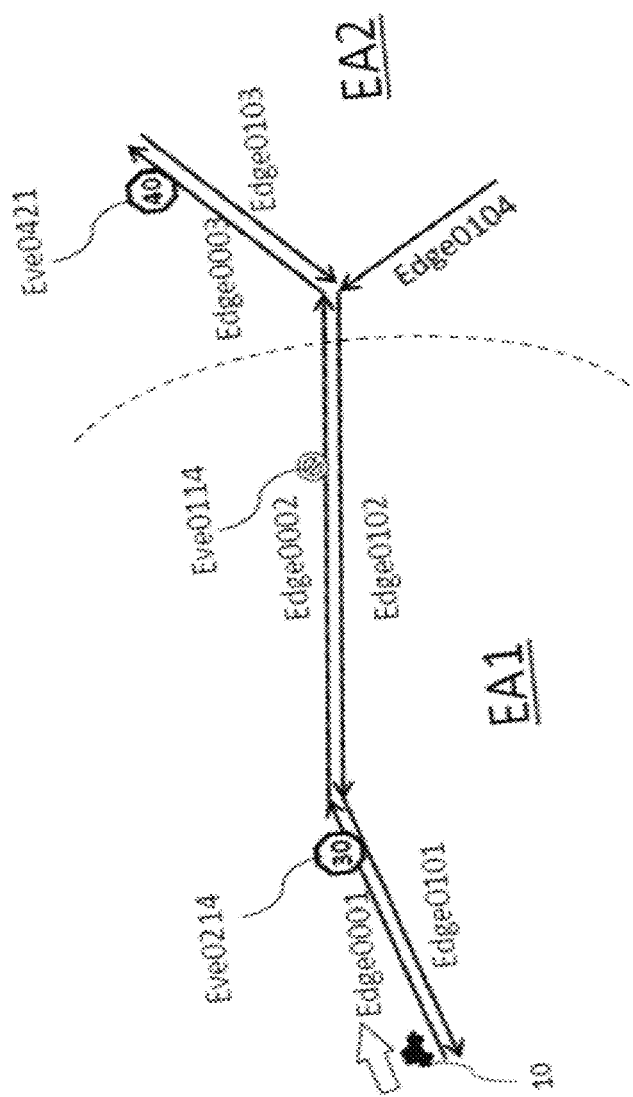
FIG. 12 shows a mobile object 10 and events according to one embodiment.

FIG. 12 shows a mobile object and events, according to an embodiment of the present invention. In the embodiment of FIG. 12, the target mobile object 10 is traveling eastbound on the edge 0001, which is the target route. The target event agent EA1 manages an area including the edge 0001, the edge 0002, the edge 0101, and the edge 0102, and the neighboring event agent EA2 manages an area including the edge 0003, the edge 0103, and the edge 0104.

Direction dependent edges are described in FIG. 12. However, edges may not be direction dependent according other embodiments, and in such embodiments, the event agent may manage events, candidate events, and influence events with direction information. The target event agent EA1 manages an event (Eve 0214) on the edge 0001 as the target event in the event list. Since the edge 0002 is apart from the edge 0001 within the threshold distance, the target event agent EA1 also manages an event (Eve 0114) on the edge 0002 as an influence event in the event list. The target event agent EA1 manages a notification event list including the target event (Eve0214) and the influence event (Eve 0114) for the target mobile object 10.

In the embodiment of FIG. 12, the mobile object agent managing target mobile object requests the event agent EA1 that manages the target event (e.g., Eve 0214) and the influence event (e.g., Eve 0114) to send the notification event list including the target event and the influence event. In another embodiment, the mobile object agent may request the remote event agent EA2 that manages the information of influence event(s) (e.g., Eve0421) to send a notification event list containing information of the influence event(s) if the influence event is located outside of the area including the target route (Edge 0001).

Figure 13:
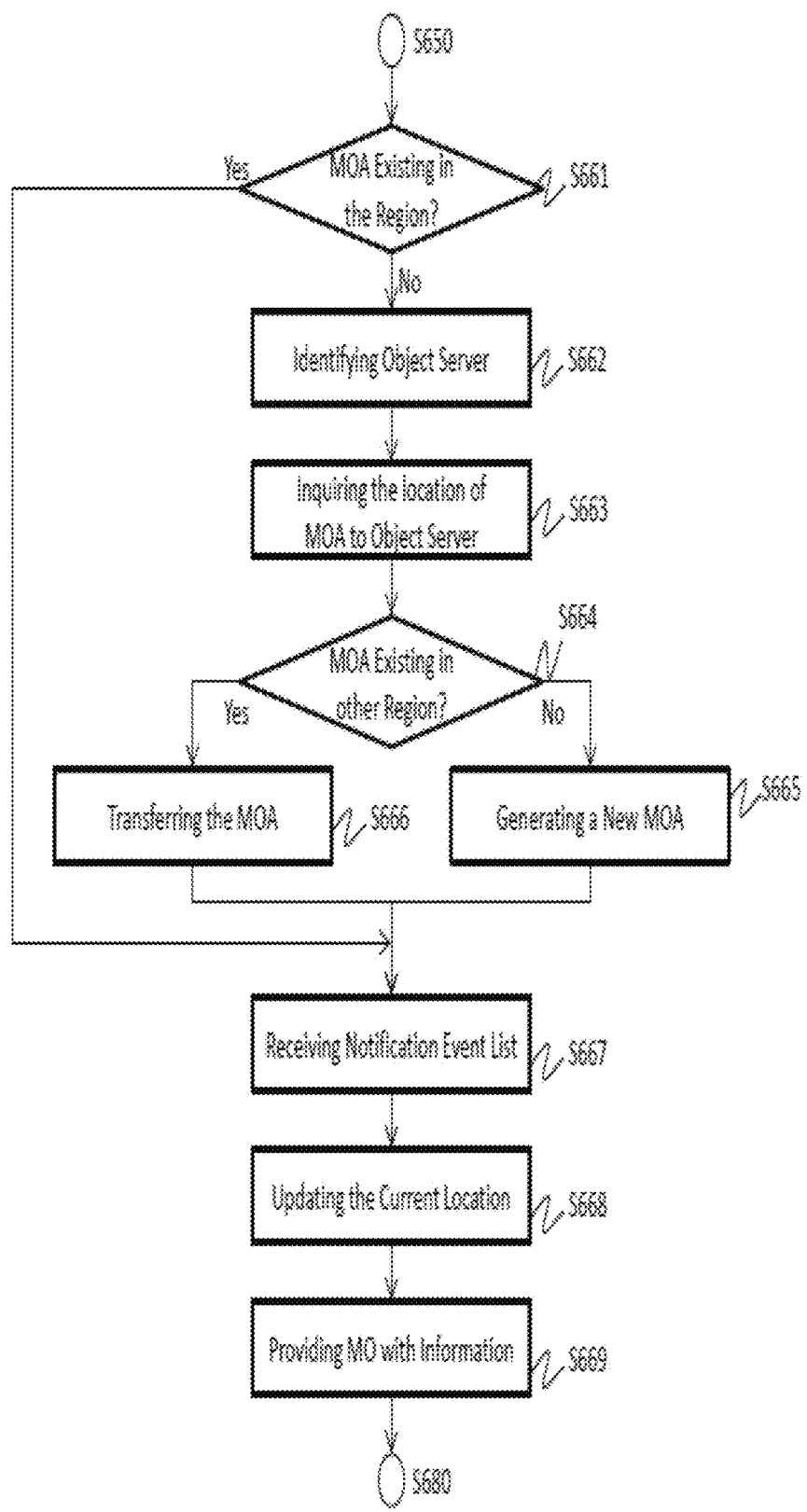
FIG. 13 shows an operational flow of S660 according to the present embodiment.

FIG. 13 shows an operational flow of mobile object processing, according to an embodiment of the present invention. The present embodiment describes an example in which the system manages the target mobile object, such as in S660 of FIG. 6, through processes S661 to S669 shown in FIG. 13.

At S661, the mobile object server may determine whether the mobile object agent for the target mobile object exists in the region determined to be the region of the mobile object, such as the region determined at S640. In other words, the mobile object server determines whether the mobile object server manages the mobile object agent of the target mobile object. If the decision is positive, then the mobile object server proceeds with the process S667, and if negative, the mobile object server proceeds with the process S662.

At S662, the mobile object server may identify an object server that includes the object agent containing the information of the target mobile object. In one embodiment, the mobile object server may identify the object server in the same manner described in S622.

Next, at S663, the mobile object server may inquire the object server 230 identified at S662 for the location of the mobile object agent of the target mobile object. The object server may refer to the object agent of the target mobile object, obtain information of the mobile object server that currently manages the mobile object agent MOA of the target mobile object, if it exists, and provide the mobile object server with the information.

Next, the mobile object server may determine whether the mobile object agent for the target mobile object exists in any other regions. In other words, the mobile object server may determine which mobile object server manages the mobile object agent for the target mobile object from the plurality of mobile object servers managing other regions, at S663. If the decision is positive, then the mobile object server proceeds with the process S666, and if negative the mobile object server proceeds with the process S665.

At S665, the mobile object server generates a new mobile object agent MOA for the target mobile object. The mobile object server may generate the mobile object agent MOA for the target mobile object by obtaining information of the target mobile object from the object server that includes the object agent containing the information of the target mobile object. In one embodiment, the mobile object server may generate the new mobile object agent in the same manner described in S623. The mobile object server may also communicate with the object server via the gateway apparatus, and register the current region of the target mobile object in the object agent corresponding to the target mobile object. By generating the new mobile object agent, the system can handle a new mobile object 10 that has been not managed by the mobile object server.

At S666, the mobile object server may transfer the mobile object agent from the other mobile object server determined to manage the mobile object agent for the target mobile object at S664. In one embodiment, the mobile object server may receive information of the mobile object agent for the target mobile object from the other mobile object server, and generate a new mobile object agent including the received information. The mobile object server may also communicate with the object server via the gateway apparatus, and register the current region of the target mobile object in the object agent of the target mobile object.

Next, at S667, the mobile object server may receive a notification event list for the target mobile object. In one embodiment, the mobile object server first determines the target route where the target mobile object is located. Then, the mobile object server may request the event agent that manages the information of target event(s) and influence event(s) corresponding to the target route to send a notification event list containing information of the target event(s) and influence event(s) of the target route.

At S668, the mobile object server may update the current location of the target mobile object by the mobile object agent. In one embodiment, the mobile object agent for the target mobile object updates the current location of the target mobile object based on the position information of the car probe data.

At S669, the mobile object server may execute the mobile object agent for the target mobile object to provide the target mobile object with information that assists the target mobile object with traveling in the geographic space based on the information included in the event list. In one embodiment, the mobile object agent may provide the target mobile object with information of events on the notification event list.

In one embodiment, the at least one mobile object server may execute the mobile object agent for the target mobile object to provide the target mobile object with information that assists the target mobile object with traveling in the geographic space based on the information of the at least one passenger of the target mobile object. For example, the mobile object agent may provide the target mobile object with an alert, a notice, and/or an action list relating events on the notification event list depending on a number of passengers (e.g., for guiding a car pool lane), the age, gender, license, real time information (e.g., driving history or sleep history), and characteristics of the passengers.

The action list is a list of actions recommended to passengers in response to the events (e.g., braking, accelerating, and/or steering of the target mobile object).

The action list may include commands to the target mobile object for automatic driving and/or driving assist. In one embodiment, the mobile object agent may include information that the passenger is sensitive to rough driving, and then the mobile object agent may provide commands to gently drive the target mobile object. In one embodiment, the mobile object agent may include information of driving skill of a driver passenger, and then provide different commands depending on the skill of the driver. The mobile object server may provide the target mobile object with the information via the gateway apparatus.

As described above, the mobile object server receives information from the target mobile object in the region assigned to the mobile object server, and generates the mobile object agent for the target mobile object if there is no mobile object server among the plurality of mobile object servers that is executing the mobile object agent.

Figure 14:
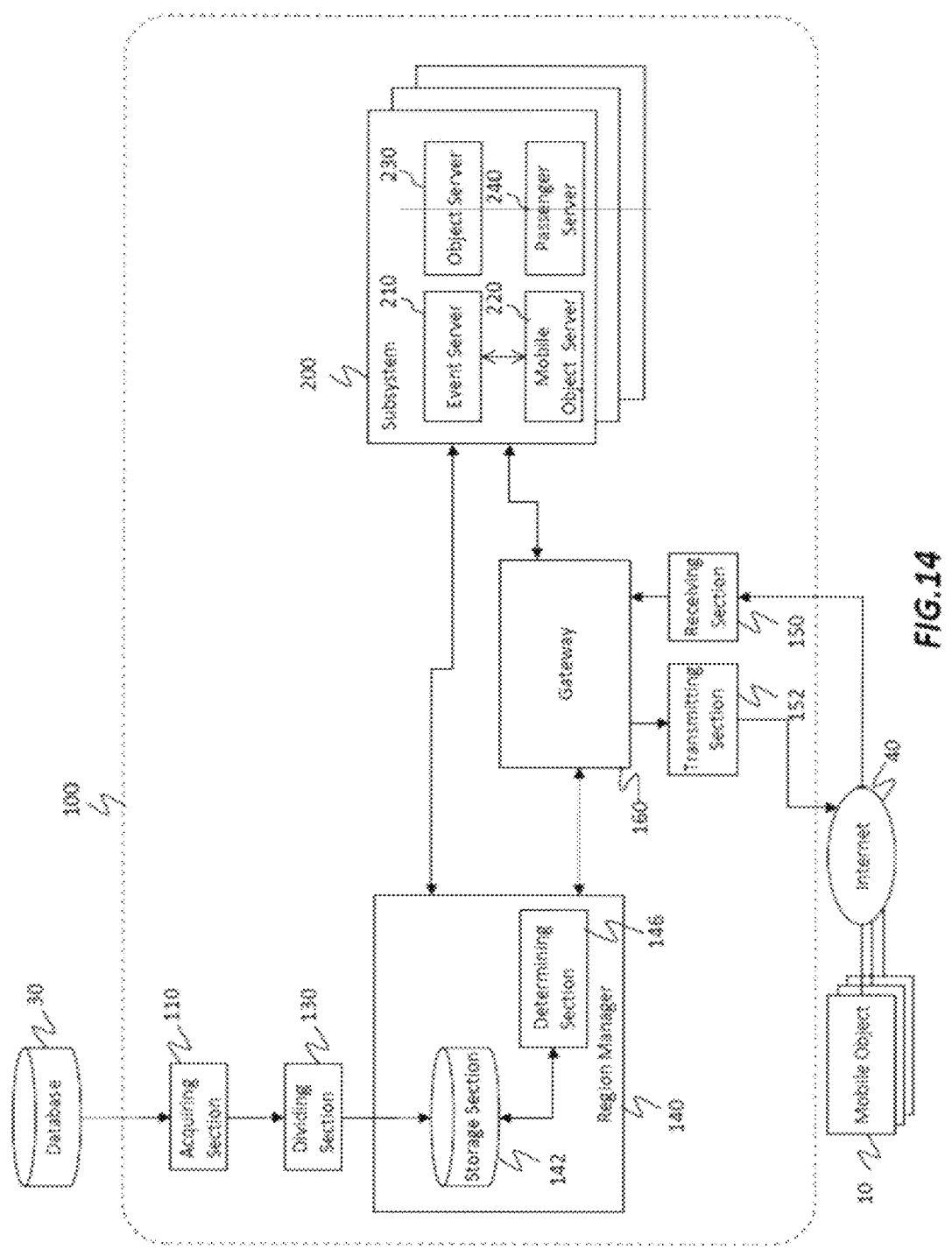
FIG. 14 shows a second exemplary configuration of the system 100 according to the present embodiment.

FIG. 14 shows an exemplary configuration of the system 100, according to an embodiment of the present invention. In this embodiment, each subsystem 200 includes an event server 210, mobile object server 220, an object server 230, and a passenger server 240. However, other embodiments are also possible, in which each subsystem 200 comprises any combination of singles or multiples of each server. In other embodiments, the system 100 may manage allocation of object agents of the object server 230 and passenger agents of the passenger server 240 in the subsystem 200. For example, the gateway apparatus 160 may change allocation of the object/passenger agents to the subsystems 200 to rectify the imbalance of data processing loads among the subsystems 200.

In the embodiment described above, the event server 210 may manage allocated event agents. In other embodiments, the system 100 may manage allocation of event agents to the event servers 210. For example, the gateway apparatus 160 may change allocation of event agents to the event servers 210 to rectify the imbalance of loads of processing events among the event servers 210. In the embodiment described above, the event server 210 causes each event agent to manage allocated divided area derived from a region. In other embodiment, the event server 210 causes at least one event agent to manage specific information regarding events (e.g., cross section of roads or other specific function(s) of a map, or, hurricane or other disaster/accident).

Figure 15:
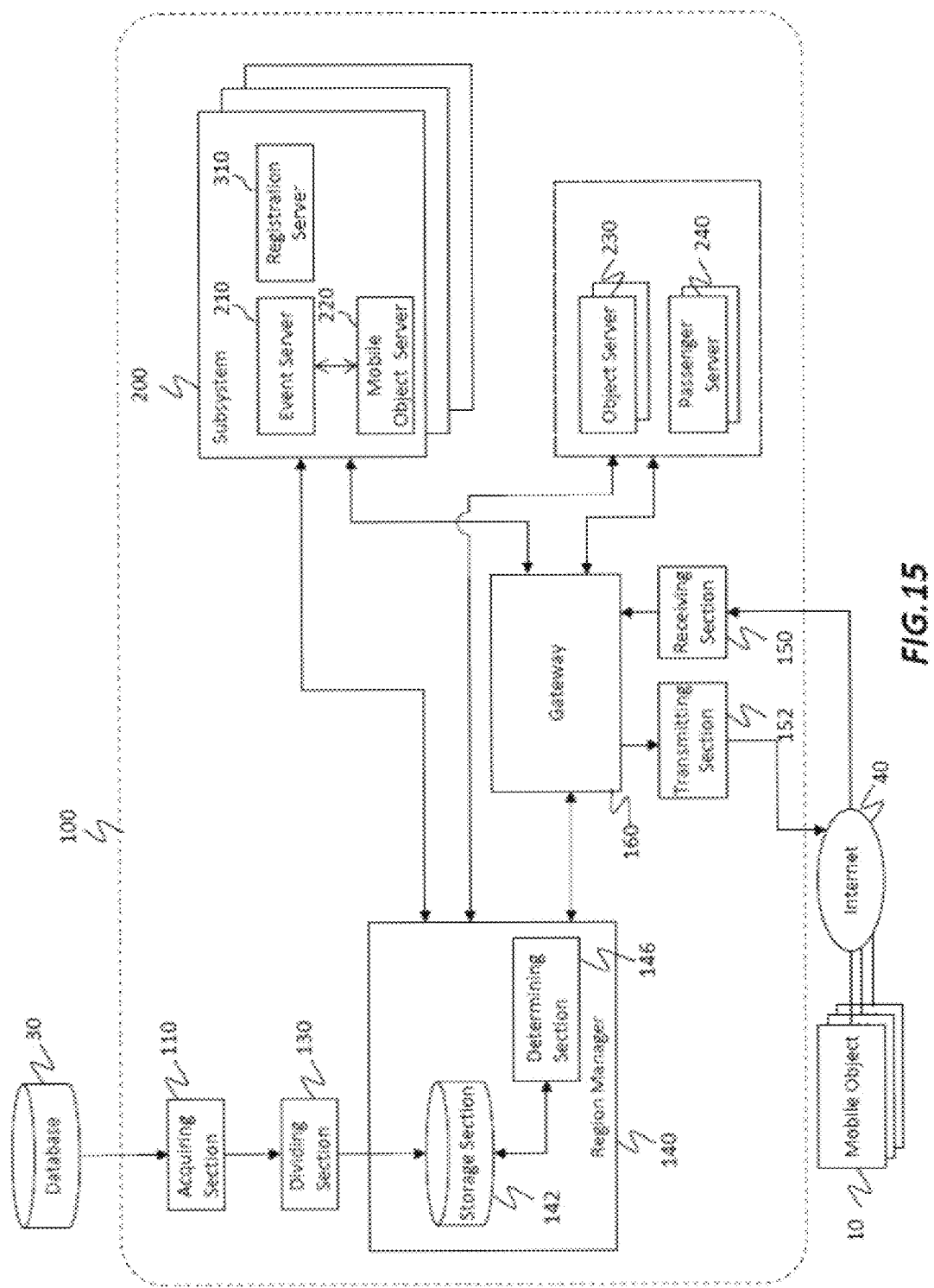
FIG. 15 shows a third exemplary configuration of the system 100 according to the present embodiment.

FIG. 15 shows an exemplary configuration of a system 100 according to the present embodiment. In the system 100 according to the present embodiment, components having substantially the same operation as components of the system 100 of the embodiment shown in FIGS. 3 and 14 are given the same reference numerals, and redundant descriptions are omitted. The system 100 according to the present embodiment is in communication with a plurality of mobile objects 10 to manage these mobile objects, and also provides each individual mobile object or individual passenger with different information, services, and the like in real time.

As described above, the system 100 includes an event server 210 that processes events occurring in a geographic space and a mobile object server 220 operable to transmit suitable event information to each mobile object 10 and assist with the movement of the plurality of mobile objects 10 in the geographic space. In the present embodiment, the process of transmitting event information to a mobile object 10 performed by the mobile object server 220 is referred to as a first basic process. The system 100 includes a registration server 310 for each subsystem 200.

The registration server 310 may be operable to register a first additional process to be performed in addition to the first basic process common to a plurality of mobile objects 10, in association with a single mobile object 10 among the plurality of mobile objects 10. In this case, the registration server 310 may be operable to register the first additional process in association with one mobile object agent associated with one mobile object 10. The registration server 310 may register the first additional process with a mobile object agent, or may instead register the first additional process with the object server 230.

The registration server 310 may register a rule and/or logic that is a process more complex than a rule as each first additional process. Specifically, the registration server 310 may register an inherent rule and/or logic to one or more mobile objects 10 as first additional processes in the corresponding one or more mobile object agents. A first basic process may be a rule and/or logic performed in common for the plurality of mobile objects 10, and registered in the event server 210 or the event agent server.

The registration server 310 may be operable to register a second addition process to be performed in addition to a second basic process common to a plurality of passengers, in association with a single passenger among the plurality of passengers. In this case, the registration server 310 may register the second additional process with one passenger agent associated with one passenger.

The registration server 310 may register a rule and/or logic that is a process more complex than a rule as each second additional process. The registration server 310 may register an inherent rule and/or logic to one or more passengers as second additional processes in the corresponding one or more passenger agents. The second basic process may be a rule and/or logic performed in common for the plurality of passengers. The second basic process is registered in the passenger agent or event agent and performed by the passenger server 240 or the event server 210 according to characteristics of the passengers, for example.

The mobile object server 220 according to the present embodiment may be operable to receive information from each of a plurality of mobile objects 10 in a geographic space and perform a process associated with each mobile object 10. In this case, the mobile object server 220 may be operable to perform processes set for a mobile object agent associated with each of the mobile objects 10. Specifically, rules and/or logic corresponding respectively to the plurality of mobile objects 10 may be registered in mobile object agents corresponding respectively to the mobile objects 10, and the mobile object server 220 may perform the rules and/or logic registered in the event agents.

The mobile object server 220 may be operable to perform the processes set for the mobile object agents associated respectively with the mobile objects 10, using the event processing results of the event server 210. In this case, after the event processing by the event server 210, the mobile object server 220 may perform the processes recorded in the mobile object agents.

The mobile object server 220 may be operable to perform processes associated respectively with the passengers. In this case, the mobile object server 220 may be operable to perform the processes set for the passenger agent associated with each passenger riding in one mobile object 10. Specifically, if rules and/or logic corresponding respectively to a plurality of passengers are registered in corresponding passenger agents, the mobile object server 220 may perform the rules and/or logic registered in the passenger servers.

The system 100 includes a plurality of the mobile object servers 220, and therefore each mobile object server 220 may be operable to perform processes set for a mobile object agent associated with each of the mobile objects 10 moving respectively in a plurality of regions obtained by dividing the geographic space. Each mobile object server 220 may be operable to perform the processes set for the passenger agent associated with each of the mobile objects 10 moving respectively in the plurality of regions obtained by dividing the geographic space.

The system 100 of the present embodiment described above identifies the mobile object agent and passenger agent corresponding to the car probe data acquired from a mobile object 10, and performs the processes set in this mobile object agent and passenger agent. The operation of such a system 100 is described below.

Figure 16:
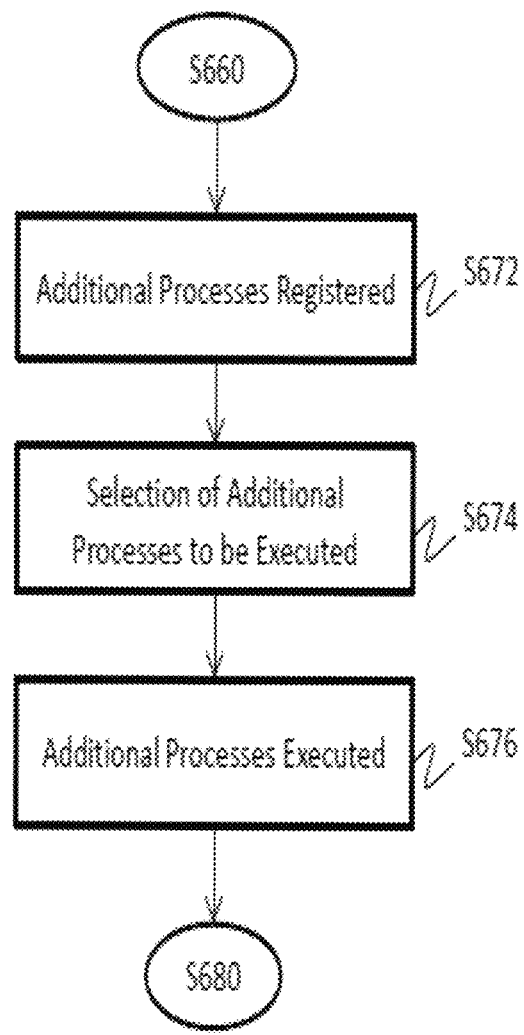
FIG. 16 shows an exemplary configuration of a portion of the operational flow of the system 100 according to the present embodiment.

FIG. 16 shows an exemplary configuration of a portion of the operational flow of the system 100 according to the present embodiment. The system 100 according to the present embodiment performs the operational flow shown in FIG. 16 to perform each process set for a plurality of mobile objects 10 in the geographic space. For example, the operational flow shown in FIG. 16 is performed by the system 100 after S660 of the operational flow described in FIG. 6.

Specifically, in the processing up to S660, the system 100 may receive the car probe data from a mobile object 10 and identify the mobile object agent corresponding to the mobile object 10 and the passenger agent corresponding to the passenger of the mobile object 10. The system 100 may identify the event agent associated with the identified mobile object agent and passenger agent, and perform the first basic process and/or second basic process set for the identified event agent. For example, in response to an event that is an accident occurrence on a route on which the mobile object 10 moves, the system 100 performs a process of notifying the mobile object 10 with information about this accident as the first basic process.

At S672 in FIG. 16, the registration server 310 may register the first additional processes and/or the second additional processes. The registration server 310 may register the corresponding first additional process in one or more mobile object agents identified in the processing up to S660. The registration server 310 may register, in each mobile object agent, a first additional process corresponding to a characteristic, state, travelled route, or the like of the mobile object 10. For example, for one mobile object 10 that includes a navigation system and has turned ON a setting to display information concerning detours, the registration server 310 registers a first additional process of "if there is an accident, search for a detour where this accident has occurred and provide the search results as notification" in the mobile object agent corresponding to this one mobile object 10.

The registration server 310 may register a corresponding second additional process in one or more passenger agents identified in the processing up to S660. The registration server 310 may register, in each mobile object agent, a second additional process corresponding to a characteristic or the like of a passenger of the mobile object 10. For example, for a passenger of one mobile object 10 who has a medical license, the registration server 310 may register a second additional process of "if there is an accident, search for the scale of the accident, people injured in the accident, the dispatch state of ambulances, and the like, and provide the search results as notification" in the passenger agent corresponding to the passenger of the one mobile object 10.

The registration server 310 may be operable to register a call-up condition for calling up a first additional process, in association with one mobile object agent. In a similar manner, the registration server 310 may be operable to register a call-up condition for calling up a second addition process, in association with one passenger agent. The registration server 310 may be operable to register the first additional process and the second additional process together with respective priorities. If there is no new process to be registered beyond the processes that have already been registered, the registration server 310 may proceed to the next stage.

At S674, the mobile object server 220 may select a first additional process and a second additional process to be performed. If a call-up condition is registered for the first additional process or the second additional process, the mobile object server 220 may select the additional process that fulfills this call-up condition.

If the number of registered first additional processes and second additional processes is less than or equal to a reference number or a threshold value, the mobile object server 220 may select all of the registered first additional processes and second additional processes. In this case, the mobile object server 220 may perform all of the registered first additional processes and second additional processes. If the number of registered first additional processes and second additional processes is greater than the reference number or the threshold value, the mobile object server 220 may select a number of first additional processes and second additional processes substantially equal to the reference number or the threshold value. In this case, the mobile object server 220 may select the first additional processes and second additional processes to be performed according to the priority or the like.

The mobile object server 220 may be operable to perform the additional processes associated with each mobile object 10, at S676. The mobile object server 220 may be operable to, when performing processes set for one mobile object agent, call up and perform a first additional process in response to the call-up condition being satisfied. Similarly, the mobile object server 220 may be operable to, when performing processes set for one passenger agent, call up and perform a second additional process in response to the call-up condition being satisfied. The mobile object server 220 may perform all of the first additional processes and second additional processes for which no call-up condition is registered in the mobile object agent and the passenger agent. The mobile object server 220 may perform the first additional processes and the second additional processes according to the priority or the like.

The mobile object server 220 may be operable to perform a process of providing notification that one mobile object 10 has become distanced from a predetermined location or geographical region. For example, if a mobile object 10 having a theft notification function set to ON has moved at least a reference distance from a parking position, the mobile object server 220 provides notification of theft to a registered destination. Furthermore, if a passenger has a contract for insurance that stipulates conditions such as an age limit, a passenger limit (e.g. family members only), a driving region limit (e.g. a country or state), a vehicle type, a license, a limit to a certain automobile, or the like, the mobile object server 220 may notify the passenger in response to the contract conditions being violated (e.g. if the mobile object 10 moves outside of the limited driving region).

If a family member is driving who is unused to driving, for example, the mobile object server 220 may provide a warning as notification to the registered destination in response to the mobile object 10 moving outside of a set range. If the mobile object 10 is a specialized vehicle that is wider and taller than a normal passenger automobile, in response to this mobile object 10 moving off of a route on which a vehicle with this height and width can travel, the mobile object server 220 may provide the passengers with a warning, search for a route on which the mobile object 10 can travel, and provide notification of this route or guidance to this route.

The mobile object server 220 may be operable to perform a process of providing notification that someone other than a predetermined passenger is manipulating one mobile object 10, as the first additional process or the second additional process. Since the mobile object server 220 can perform processing including complicated logic, it is possible to perform processes such as transmitting e-mail, making a telephone call, providing notification to a plurality of registered destinations, providing notification to a second candidate if notification to a first candidate is impossible, and the like.

The mobile object server 220 may perform processes set for a mobile object agent using processing results of an event from the event server 210. For example, in response to an event of an accident occurring on a route on which a mobile object 10 is moving, the mobile object server 220 performs a process that includes searching for a detour route near the location where this accident occurred and providing the search results as notification, as the first additional process. Furthermore, in response to an event of an accident occurring on a route on which a mobile object 10 is moving, the mobile object server 220 may perform a process that includes searching for the scale of the accident, people injured in the accident, the dispatch state of ambulances, and the like, and providing the search results as notification as the second additional process.

If the additional processes of the mobile object server 220 have ended, the system 100 may perform S680 of the operational flow shown in FIG. 6. By performing the operational flow described above, the system 100 according to the present embodiment can provide an additional process that includes handling different information and performing services in real time, for each mobile object 10 or each passenger.

FIG. 17 shows feature information used to select the first additional process to be performed, by the mobile object server 220 according to the present embodiment. As an example, FIG. 17 shows feature information used when the mobile object server 220 performs the operation of S674 shown in FIG. 16. The mobile object server 220 may manage a plurality of mobile objects 10 using corresponding mobile object IDs, and FIG. 17 shows these mobile object IDs in the first column. The second column and the third column in FIG. 17 show the current location of each mobile object 10. The fourth column in FIG. 17 shows whether the owner of the mobile object 10 is an individual or a company. In this way, the second to fourth columns of FIG. 17 may include feature information held by the mobile object agents corresponding to the mobile objects 10.

The fifth column in FIG. 17 shows the age of the passengers, the sixth column shows whether the passengers are the owners, and the seventh column shows the number of people riding along with the passengers (drivers) of the mobile objects 10. In this way, the fifth to seventh columns of FIG. 17 may include feature information held by the passenger agents corresponding to the passengers of the mobile objects 10. The mobile object server 220 may be operable to perform a corresponding additional process if a change occurs in this feature information.

Specifically, the call-up conditions registered by the registration server 310 may have, as necessary conditions, changes of designated pieces of feature information among a plurality of pieces of feature information relating to one mobile object 10 held by one mobile object agent. For example, in response to a change occurring in the current position of a mobile object 10 in the second column and/or the third column, the mobile object server 220 performs a first additional process such as "searching for whether the current position is included in a region that is covered by the insurance to which the owner of the mobile object 10 is subscribed, and providing the search results as notification."

The call-up conditions registered by the registration server 310 may have, as necessary conditions, changes of designated pieces of feature information among a plurality of pieces of feature information relating to one passenger held by one passenger agent. For example, in response to a change occurring in the feature information of a passenger in the sixth column, the mobile object server 220 performs a second additional process such as "searching for whether the current passenger is included as a person insured by the insurance to which the owner of the mobile object 10 is subscribed, and providing the search results as notification." As another example, in response to a change occurring in the feature information of a passenger in the sixth column, the mobile object server 220 performs a second additional process such as "searching for whether the current passenger is an acquaintance or family member registered by the owner of the mobile object 10, and providing the owner with the search results as notification."

FIG. 17 shows an example of a security company and insurance company to which a passenger is subscribed providing information, a service, or the like to a mobile object 10 and the passenger. In this case, the insurance company and security company may make a request for settings of the system 100 or the like based on the information, service, or the like to be provided, to the designer, manager, and/or proprietor of this system 100. Instead, the system 100 may be operable to allow a service provider differing from the designer, manager, and/or proprietor of this system 100 to access the system and provide the service. Such a system 100 is described below.

Figure 18:
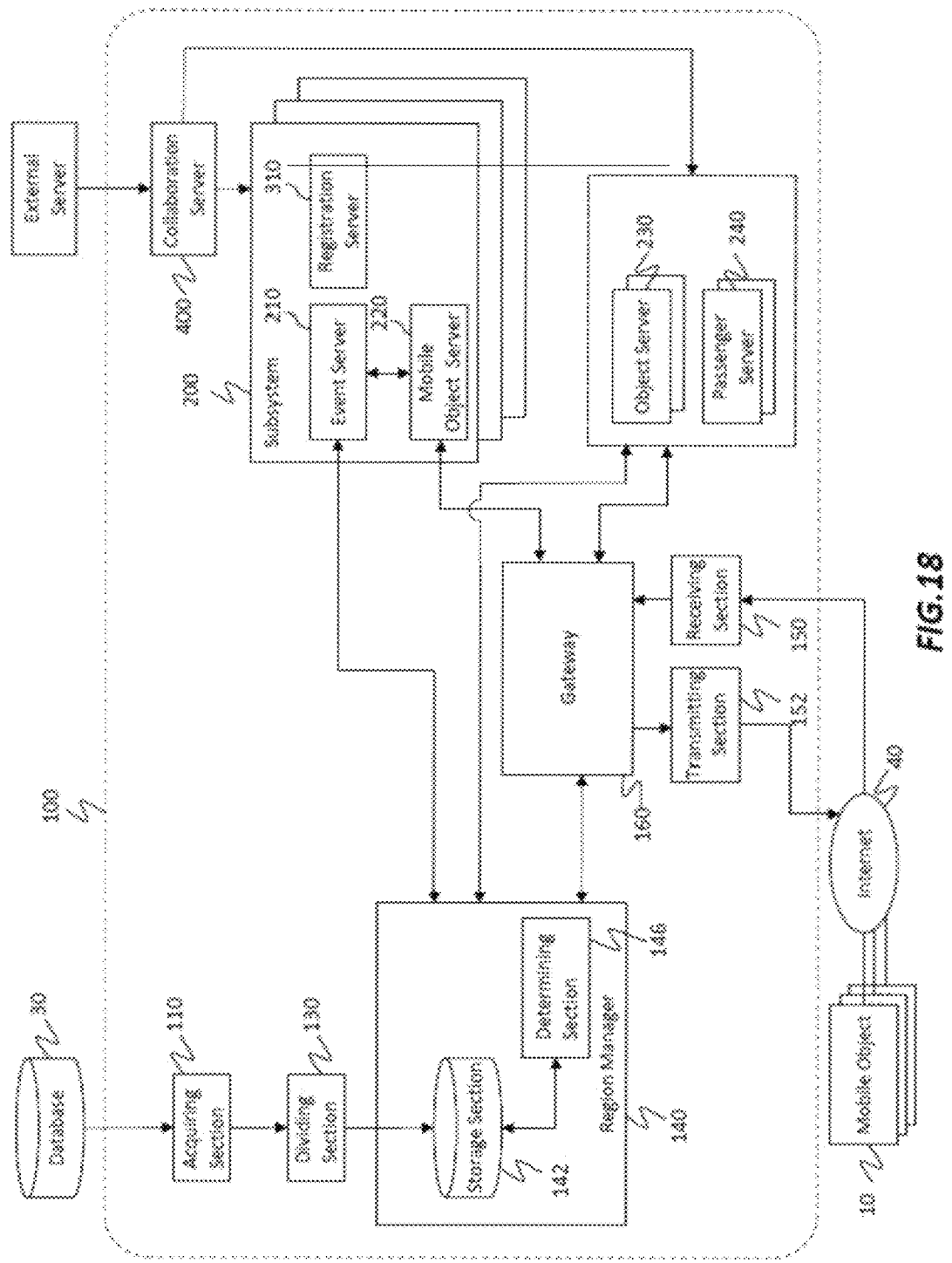
FIG. 18 shows a fourth exemplary configuration of the system 100 according to the present embodiment.

FIG. 18 shows an exemplary configuration of the system 100 according to the present embodiment. In the system 100 according to the present embodiment, components having substantially the same operation as those of the system 100 according to the embodiment shown in FIG. 15 are given the same reference numerals and redundant descriptions are omitted. The system 100 according to the present embodiment is an example of a service platform for a plurality of mobile objects that is operable to cooperate with an external system or the like. The system 100 may further include a collaboration server 400.

The collaboration server 400 may be operable to control access to the system 100 from an external server or the like. The collaboration server 400 may be operable to perform authentication of the external server, for example. The collaboration server 400 manages mobile objects, passengers, rules, logic, and/or external servers using respectively corresponding IDs, and controls the access, for example.

An external server or the like that has been authenticated by the collaboration server 400 may be operable to communicate with the event server 210, the mobile object server 220, the object server 230, the passenger server 240, and/or the registration server 310. Furthermore, an external server or the like that has been authenticated by the collaboration server 400 may be operable to communicate with a mobile object agent, a passenger agent, and/or an event agent.

Specifically, the mobile object server 220 may be operable to call-up a service process provided by the external server or the like when performing a first additional process registered in one mobile object agent. In this way, a service provider or the like that is different from the designer, manager, and/or proprietor of the system 100 can provide services and information using real time data of a plurality of mobile objects 10, for example.

The registration server 310 may be operable to register a first additional process in association with one mobile object agent in response to a request from an external server or the like that is run by a service provider providing a service. In this way, a service provider or the like that is different from the designer, manager, and/or proprietor of the system 100 can design or add a variety of services that are not offered by the system.

For example, a security company can provide the owner of a mobile object 10 who has entered into a contract with a theft prevention service. In response to a person who is not a registered passenger moving the mobile object 10 outside of a set region, the security company may provide the owner of the mobile object 10 with a warning and track the movement of the mobile object 10. In response to instructions from the owner or a reference time having passed, the security company may notify the police or the like of theft.

An insurance company can provide the owner of a mobile object 10 who has entered into a contract with real time information indicating whether the insurance is applicable. If the owner of the mobile object 10 has done something that falls outside the range covered by the insurance, the insurance company may provide an insurance contract that covers a wider range.

A car rental company can provide a service using the position information of a user. The car rental company may provide services corresponding to detailed monetary amounts, according to the movement distance and/or the movement region. The rental car company may suitably designate a rental location and a return location, according to the position information of the user and the arrangement state of the mobile objects 10. A taxi company and a taxi driver can know a dispatch state and occupied state in real time.

The above describes an example in which the system 100 according to the present embodiment has the registration server 310 register the first additional processes, second additional processes, and call-up conditions in the mobile object agents. Instead, the registration server 310 may register the first additional processes, second additional processes, and call-up conditions in object servers 230 associated with the mobile object agents. In this case, the mobile object server 220 may be operable to copy the information of the mobile object 10 and the information concerning the first additional processes, second additional processes, and call-up conditions from the object server 230 to the mobile object agent during the step of generating the mobile object agent corresponding to a mobile object 10, e.g. S623 of FIG. 7.

In this way, the mobile object server 220 can perform the processes set for the mobile object agent based on information possessed by the mobile object agent, and can therefore improve the processing speed. The registration server 310 may be operable to perform the registration to the object server 230 before the step of generating the mobile object agent. Specifically, the registration server 310 may be operable to register the first additional processes, second additional processes, and call-up conditions in the object server 230 during S620 (initialization) in FIG. 6.

Instead, for some of the mobile objects 10 among the plurality of mobile objects 10, the mobile object server 220 may copy the information of the mobile objects 10 and the information of the first additional processes, second additional processes, and call-up conditions from the object server 230 to the mobile object agents. Instead of this, for a plurality of mobile objects 10, the mobile object server 220 need not copy the information of the first additional processes, second additional processes, and call-up conditions from the object server 230 to the mobile object agents.

The mobile object server 220 may be operable to, if performing a mobile object agent that does not include information of a first process, a second process, or a call-up condition, question the object server 230 about this information. In this way, the subsystem 200 can decrease the amount of memory used.

If a process with high performance frequency, a condition with high change frequency, or a process desired to have a high processing speed is determined, the mobile object server 220 may copy the information of the first additional processes, second additional processes, and call-up conditions corresponding to this process from the object server 230 to a mobile object agent. In other words, if a process with low performance frequency, a condition with low change frequency, or a process whose processing speed is irrelevant is determined, the mobile object server 220 need not copy the information corresponding to this process or condition from the object server 230 to the mobile object agent. In this way, the subsystem 200 can improve the processing speed while reducing the amount of memory used.

Figure 19:
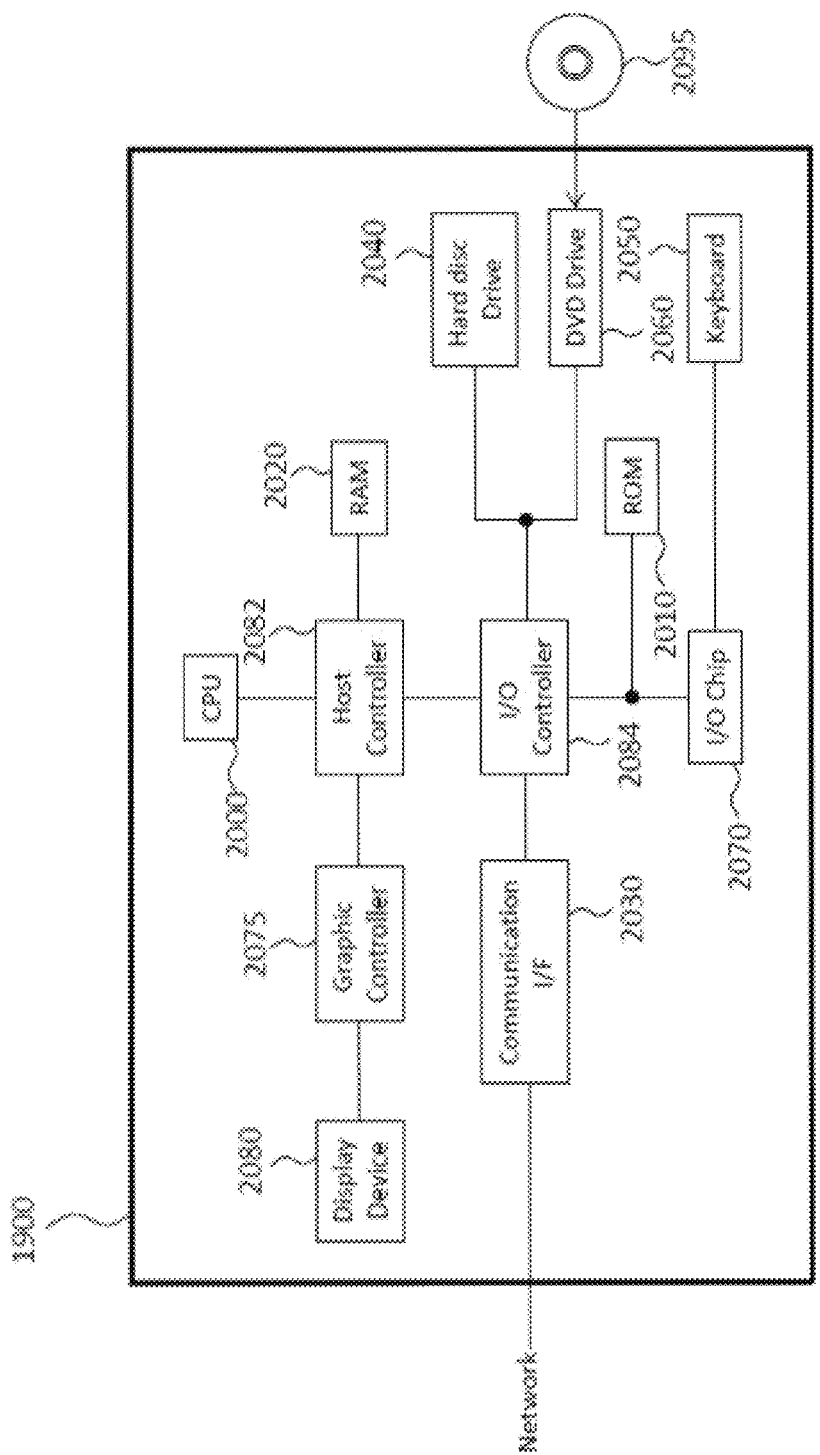
FIG. 19 shows a computer according to an embodiment of the invention.

FIG. 19 shows an exemplary configuration of a computer 1900 according to an embodiment of the invention. The computer 1900 according to the present embodiment includes a CPU 2000, a RAM 2020, a graphics controller 2075, and a display apparatus 2080 which are mutually connected by a host controller 2082. The computer 1900 also includes input/output units such as a communication interface 2030, a hard disk drive 2040, and a DVD-ROM drive 2060 which are connected to the host controller 2082 via an input/output controller 2084. The computer also includes legacy input/output units such as a ROM 2010 and a keyboard 2050 which are connected to the input/output controller 2084 through an input/output chip 2070.

The host controller 2082 connects the RAM 2020 with the CPU 2000 and the graphics controller 2075 which access the RAM 2020 at a high transfer rate. The CPU 2000 operates according to programs stored in the ROM 2010 and the RAM 2020, thereby controlling each unit. The graphics controller 2075 obtains image data generated by the CPU 2000 on a frame buffer or the like provided in the RAM 2020, and causes the image data to be displayed on the display apparatus 2080. Alternatively, the graphics controller 2075 may contain therein a frame buffer or the like for storing image data generated by the CPU 2000.

The input/output controller 2084 connects the host controller 2082 with the communication interface 2030, the hard disk drive 2040, and the DVD-ROM drive 2060, which are relatively high-speed input/output units. The communication interface 2030 communicates with other electronic devices via a network. The hard disk drive 2040 stores programs and data used by the CPU 2000 within the computer 1900. The DVD-ROM drive 2060 reads the programs or the data from the DVD-ROM 2095, and provides the hard disk drive 2040 with the programs or the data via the RAM 2020.

The ROM 2010 and the keyboard 2050 and the input/output chip 2070, which are relatively low-speed input/output units, are connected to the input/output controller 2084. The ROM 2010 stores therein a boot program or the like executed by the computer 1900 at the time of activation, a program depending on the hardware of the computer 1900. The keyboard 2050 inputs text data or commands from a user, and may provide the hard disk drive 2040 with the text data or the commands via the RAM 2020. The input/output chip 2070 connects a keyboard 2050 to an input/output controller 2084, and may connect various input/output units via a parallel port, a serial port, a keyboard port, a mouse port, and the like to the input/output controller 2084.

A program to be stored on the hard disk drive 2040 via the RAM 2020 is provided by a recording medium as the DVD-ROM 2095, and an IC card. The program is read from the recording medium, installed into the hard disk drive 2040 within the computer 1900 via the RAM 2020, and executed in the CPU 2000.

A program that is installed in the computer 1900 and causes the computer 1900 to function as an apparatus, such as the region manager, the subsystems 200 and other element(s) in the system 100 of FIG. 3, FIG. 14, FIG. 15, and FIG. 18, includes a determining module. The program or module acts on the CPU 2000, to cause the computer 1900 to function as a section, component, element such as determining section 146.

The information processing described in these programs is read into the computer 1900, to function as the determining section, which is the result of cooperation between the program or module and the above-mentioned various types of hardware resources. Moreover, the apparatus is constituted by realizing the operation or processing of information in accordance with the usage of the computer 1900.

For example when communication is performed between the computer 1900 and an external device, the CPU 2000 may execute a communication program loaded onto the RAM 2020, to instruct communication processing to a communication interface 2030, based on the processing described in the communication program. The communication interface 2030, under control of the CPU 2000, reads the transmission data stored on the transmission buffering region provided in the recording medium, such as a RAM 2020, a hard disk drive 2040, or a DVD-ROM 2095, and transmits the read transmission data to a network, or writes reception data received from a network to a reception buffering region or the like provided on the recording medium. In this way, the communication interface 2030 may exchange transmission/reception data with the recording medium by a DMA (direct memory access) method, or by a configuration that the CPU 2000 reads the data from the recording medium or the communication interface 2030 of a transfer destination, to write the data into the communication interface 2030 or the recording medium of the transfer destination, so as to transfer the transmission/reception data.

In addition, the CPU 2000 may cause all or a necessary portion of the file of the database to be read into the RAM 2020 such as by DMA transfer, the file or the database having been stored in an external recording medium such as the hard disk drive 2040, the DVD-ROM drive 2060 (DVD-ROM 2095) to perform various types of processing onto the data on the RAM 2020. The CPU 2000 may then write back the processed data to the external recording medium by means of a DMA transfer method or the like. In such processing, the RAM 2020 can be considered to temporarily store the contents of the external recording medium, and so the RAM 2020, the external recording apparatus, and the like are collectively referred to as a memory, a storage section, a recording medium, a computer readable medium, etc. Various types of information, such as various types of programs, data, tables, and databases, may be stored in the recording apparatus, to undergo information processing. Note that the CPU 2000 may also use a part of the RAM 2020 to perform reading/writing thereto on the cache memory. In such an embodiment, the cache is considered to be contained in the RAM 2020, the memory, and/or the recording medium unless noted otherwise, since the cache memory performs part of the function of the RAM 2020.

The CPU 2000 may perform various types of processing, onto the data read from the RAM 2020, which includes various types of operations, processing of information, condition judging, search/replace of information, etc., as described in the present embodiment and designated by an instruction sequence of programs, and writes the result back to the RAM 2020. For example, when performing condition judging, the CPU 2000 may judge whether each type of variable shown in the present embodiment is larger, smaller, no smaller than, no greater than, or equal to the other variable or constant, and when the condition judging results in the affirmative (or in the negative), the process branches to a different instruction sequence, or calls a sub routine.

In addition, the CPU 2000 may search for information in a file, a database, etc., in the recording medium. For example, when a plurality of entries, each having an attribute value of a first attribute is associated with an attribute value of a second attribute, are stored in a recording apparatus, the CPU 2000 may search for an entry matching the condition whose attribute value of the first attribute is designated, from among the plurality of entries stored in the recording medium, and reads the attribute value of the second attribute stored in the entry, thereby obtaining the attribute value of the second attribute associated with the first attribute satisfying the predetermined condition.

The above-explained program or module may be stored in an external recording medium. Exemplary recording mediums include a DVD-ROM 2095, as well as an optical recording medium such as a Blu-ray Disk or a CD, a magneto-optic recording medium such as a MO, a tape medium, and a semiconductor memory such as an IC card. In addition, a recording medium such as a hard disk or a RAM provided in a server system connected to a dedicated communication network or the Internet can be used as a recording medium, thereby providing the program to the computer 1900 via the network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiment(s) of the present invention has (have) been described, the technical scope of the invention is not limited to the above described embodiment(s). It is apparent to persons skilled in the art that various alterations and improvements can be added to the above-described embodiment(s). It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

As made clear from the above, the embodiments of the present invention can be used to realize a system for managing geographic space and mobile objects and a platform for mobile objects thereon.

What is claimed is:

1. A system comprising:
a mobile object server operable to receive car probe data containing location data from a GPS from each of a plurality of mobile objects within a geographic space and perform a process associated with each mobile object, wherein the mobile object server is operable to perform processes by mobile object agents associated with the plurality of mobile objects;
a registration server operable to register a first additional process that is to be performed in addition to a first basic process common to the plurality of mobile objects, wherein the first additional process is associated with one mobile object of the plurality of mobile objects, wherein the registration server is operable to register the first additional process with one mobile object agent associated with the one mobile object, and wherein the registration server is operable to register the first additional process and a call-up condition by the one mobile object agent; and
the mobile object server is operable to call up the first additional process in response to the call-up condition being satisfied during performance of the one mobile object agent.

2. The system according to claim 1, comprising:
a plurality of the mobile object servers, wherein
the plurality of mobile object servers are operable to perform processes set for respective mobile object agents associated with respective mobile objects that move in each of a plurality of regions obtained by dividing the geographic space, among the plurality of mobile objects.

3. The system according to claim 1, further comprising:
an event server operable to process events that occur within the geographic space, wherein:
the mobile object server is operable to perform processes set for mobile object agents associated respectively with the plurality of mobile objects, using processing results of the events from the event server.

4. The system according to claim 1, wherein:
the call-up condition has, as a necessary condition, change of a designated piece of feature information among a plurality of pieces of feature information relating to the one mobile object held by the one mobile object agent.

5. The system according to claim 1, wherein:
the registration server is operable to register the first additional process in association with the one mobile object agent, in response to a request from an external server run by a service provider providing a service; and
the mobile object server is operable to call up a service process provided by the external server during performance of the first additional process registered in the one mobile object agent.

6. The system according to claim 1, wherein:
the mobile object server is operable to perform processes set for a passenger agent in association with each passenger riding in the one mobile object.

7. The system according to claim 6, wherein:
the registration server is operable to register a second additional process to be performed in addition to a second basic process common to a plurality of passengers, in association with the passenger agent.

8. The system according to claim 1, wherein:
the mobile object server is operable to perform a process of providing notification that the one mobile object has become distanced from a predetermined location or region, as the first additional process.

9. The system according to claim 1, wherein:
the mobile object server is operable to perform a process of providing notification that someone other than a predetermined passenger is manipulating the one mobile object, as the first additional process.

10. A method comprising:
receiving car probe data containing location data from a GPS from each of a plurality of mobile objects within a geographic space;
performing a process associated with each mobile object comprising performing processes set for mobile object agents associated respectively with the plurality of mobile objects;
registering a first additional process that is to be performed in addition to a first basic process common to the plurality of mobile objects, wherein the first additional process is associated with one mobile object of the plurality of mobile objects, and wherein registering comprises registering the first additional process with one mobile object agent associated with the one mobile object;
registering a call-up condition in association with the one mobile object agent; and
performing the first additional process in response to the call-up condition being satisfied during performance of the one mobile object agent.

11. The method according to claim 10, further comprising:
processing events that occur within the geographic space, wherein
the performing includes performing processes set for mobile object agents associated respectively with the plurality of mobile objects, using processing results of the events from the event processing.

12. The method according to claim 10, wherein:
the registering includes registering the first additional process in association with the one mobile object agent, in response to a request from an external server run by a service provider providing a service; and
the performing includes calling up a service process provided by the external server during performance of the first additional process registered in the one mobile object agent.

13. A computer program product comprising one or more computer-readable storage devices and program instructions stored on at least one of the one or more tangible storage devices, the program instructions comprising:
receiving car probe data containing location data from a GPS from each of a plurality of mobile objects within a geographic space;
performing a process associated with each mobile object; and
registering a first additional process that is to be performed in addition to a first basic process common to the plurality of mobile objects, wherein the first additional process is associated with one mobile object among the plurality of mobile objects, and wherein registering comprises registering the first additional process with one mobile object agent associated with the one mobile object;
registering a call-up condition in association with the one mobile object agent; and
performing the first additional process in response to the call-up condition being satisfied during performance of the one mobile object agent.

14. The computer program product according to claim 13, further comprising:
processing events that occur within the geographic space, wherein:
the performing includes performing processes set for mobile object agents associated respectively with the plurality of mobile objects, using processing results of the events from the event processing.

15. The computer program product according to claim 13, wherein
the registering includes registering the first additional process in association with the one mobile object agent, in response to a request from an external server run by a service provider providing a service; and
the performing includes calling up a service process provided by the external server during performance of the first additional process registered in the one mobile object agent.

* * * * *